US007565108B2

(12) United States Patent
Kotola et al.

(10) Patent No.: US 7,565,108 B2
(45) Date of Patent: Jul. 21, 2009

(54) RADIO FREQUENCY IDENTIFICATION (RF-ID) BASED DISCOVERY FOR SHORT RANGE RADIO COMMUNICATION WITH READER DEVICE HAVING TRANSPONDER FUNCTIONALITY

(75) Inventors: Sakari Kotola, Kaunianen (FI); Holger Hussmann, Tampere (FI); Carmen Kühl, Dortmund (DE); Peter Wakim, Boston, MA (US); Petri Vesikivi, Espoo (FI); Heikki Huomo, Meysey Hampton (GB)

(73) Assignee: Nokia Corporation, Espoo (FI)

( * ) Notice: Subject to any disclaimer, the term of this patent is extended or adjusted under 35 U.S.C. 154(b) by 155 days.

(21) Appl. No.: 10/804,081

(22) Filed: Mar. 19, 2004

(65) Prior Publication Data

US 2004/0176032 A1 Sep. 9, 2004

Related U.S. Application Data

(63) Continuation-in-part of application No. 10/105,320, filed on Mar. 26, 2002, now Pat. No. 6,892,052.

(51) Int. Cl.
*H04B 7/00* (2006.01)
*H04M 1/66* (2006.01)
*H04M 1/68* (2006.01)
*H04M 3/16* (2006.01)

(52) U.S. Cl. ............... 455/41.2; 455/41.3; 455/410; 455/411

(58) Field of Classification Search ............... 455/41.2, 455/41.3, 410, 411, 414.1, 415, 435.1, 558; 340/5.81

See application file for complete search history.

(56) References Cited

U.S. PATENT DOCUMENTS 5,943,624 A * 8/1999 Fox et al. ............... 455/556.1

(Continued)

FOREIGN PATENT DOCUMENTS

EP 1633104 A1 8/2006

(Continued)

OTHER PUBLICATIONS

"Radio Frequency Identification -RF-ID: A Basic Primer", Automatic Identification Manufacturers (AIM) web site (http: //www.aimglobal.org), Jan. 5, 2000, pp. 1-15.

(Continued)

*Primary Examiner*—Eugene Yun
(74) *Attorney, Agent, or Firm*—Locke Lord Bissell & Liddell

(57) ABSTRACT

A RF-ID based wireless terminal includes a reader device with transponder functionality implementing ECMA 340 standard for near field communication and has shortened session set-up and user identification. The reader device is operable in an active communication mode or a passive communication mode. During the active mode, one RF-ID tag reader simulates a RF-ID tag while the other simulates a RF-ID tag reader. The reader includes a transponder, which operates during periods of time when the reader is not energized. A radio frequency interface provides signal for operation of the reader in the reader operation mode or transponder mode of operation. An RF-ID reader upon receiving a response signal from a semi-passive or active RF-ID tag of reader emulating a tag informs the terminal CPU which instructs the short-range communication to enter e.g. a page scanning mode which shortens session set-up time and user identification.

34 Claims, 16 Drawing Sheets

U.S. PATENT DOCUMENTS

| | | | |
|---|---|---|---|
| 6,104,333 A | 8/2000 | Wood, Jr. | 341/173 |
| 6,130,623 A | 10/2000 | MacLellan et al. | |
| 6,282,407 B1 | 8/2001 | Vega et al. | 455/41 |
| 6,297,737 B1 | 10/2001 | Irvin | |
| 6,404,339 B1 | 6/2002 | Eberhardt | |
| 6,456,039 B1 | 9/2002 | Lauper et al. | 320/107 |
| 6,462,647 B1 | 10/2002 | Roz | |
| 6,566,997 B1 | 5/2003 | Bradin | |
| 6,690,402 B1 | 2/2004 | Waller et al. | |
| 6,842,621 B2 * | 1/2005 | Labun et al. | 455/456.3 |
| 6,892,052 B2 | 5/2005 | Kotola et al. | |
| 6,989,741 B2 | 1/2006 | Kenny et al. | |
| 7,049,963 B2 | 5/2006 | Waterhouse et al. | |
| 7,152,040 B1 | 12/2006 | Hawthorne et al. | |
| 2001/0007815 A1 | 7/2001 | Phillipsson | 455/41 |
| 2002/0106988 A1 | 8/2002 | Davie et al. | |
| 2002/0107742 A1 | 8/2002 | Magill | 705/17 |
| 2002/0154607 A1 | 10/2002 | Forstadius et al. | 370/311 |
| 2003/0008647 A1 | 1/2003 | Takatori et al. | 455/420 |
| 2003/0030542 A1 | 2/2003 | von Hoffmann | |
| 2003/0114104 A1 | 6/2003 | Want et al. | 455/39 |
| 2004/0164166 A1 | 8/2004 | Mahany et al. | |
| 2005/0134461 A1 | 6/2005 | Gelbman et al. | |
| 2005/0269411 A1 | 12/2005 | Vesikivi et al. | |
| 2006/0132310 A1 | 6/2006 | Cox et al. | |
| 2006/0145865 A1 | 7/2006 | Forster | |
| 2006/0244592 A1 | 11/2006 | Känsälä et al. | |

FOREIGN PATENT DOCUMENTS

| | | |
|---|---|---|
| WO | WO 01/39108 A2 | 5/2001 |
| WO | 01/45319 A1 | 6/2001 |
| WO | WO 01/45038 A2 | 6/2001 |
| WO | WO 01/45319 A1 | 6/2001 |
| WO | 02/03625 A1 | 1/2002 |
| WO | 03/079281 A1 | 9/2003 |
| WO | 03/081787 A3 | 10/2003 |
| WO | 2004/110017 A1 | 12/2004 |

OTHER PUBLICATIONS

Bray, et al., "Bluetooth Connect Without Cable", Prentice Hall PTR, ISBN 0-13-066106-6, pp. 71-87.

Charles Arehart, et al., "Professional WAP", Wrox Press Ltd., 2000 (ISBN 1-861004-04-1) pp. 1-41.

* cited by examiner (State of the Art)

RADIO FREQUENCY IDENTIFICATION (RF-ID) BASED DISCOVERY FOR SHORT RANGE RADIO COMMUNICATION WITH READER DEVICE HAVING TRANSPONDER FUNCTIONALITY

This Application is a continuation-in-part of U.S. patent application Ser. No. 10/105,320, filed Mar. 26, 2002, now U.S. Pat. No. 6,892,052 entitled "Radio Frequency Identification (RF-ID) Based Discovery For Short-Range Radio Communication", and assigned to Nokia Corporation of Keilalahdentie 4, 02150 Espoo, FINLAND.

BACKGROUND OF INVENTION

1. Field of Invention:

This invention relates to short range communication devices, processes and systems. More particularly, the invention relates to short range communication devices, processes and systems utilizing radio frequency identification systems with shorter user identification and session setup time in interactive services, and a reader device with transponder functionality.

2. Description of Prior Art

Bluetooth$^R$ is a short-range wireless communication system operating at 2.4 GHz and designed to establish connection between two or more devices operating within a ten-meter communication range, for nominal output power, but can be extended up to 100 meters for 100 mW-output power. The details of Bluetooth are described in "The Bluetooth Special Interest Group, Specification Of The Bluetooth System, Volumes 1 and 2, Core and Profiles: Version 1.1, 22 Feb., 2001, which are fully incorporated herein by reference. To discover another Bluetooth terminal, an inquiry message is transmitted searching for other devices in the vicinity. Any other Bluetooth terminal that is listening by means of conducting an inquiry scan, will recognize the inquiry message and respond. The inquiry response is a message packet containing the responding devices Bluetooth terminal Address (BD_ADDR). The Bluetooth terminal address is a unique, 48-bit IEEE address, which is electronically engraved into each Bluetooth terminal. The address is virtually guaranteed to be completely unique, so much so that it can be reliably associated with the device's user, much as can the user's passport number or social security number. One of the problems of Bluetooth terminals is the long time required for discovery of a Bluetooth terminal, which can be up to 10 seconds. In many applications, the device discovery time is too long and restricts the usage of Bluetooth, particularly for interactive services.

Radio Frequency Identification (RF-ID) is a wireless system that automatically identifies tracks and manages objects via a fast connection between the object and a RF-ID reader. RF-ID principles are described in a publication entitled "Radio Frequency Identification RF-ID: A Basic Primer", published by the Automatic Identification Manufacturers (AIM) web site (http: //www.aimglobal.org), Oct. 23, 2001 and fully incorporated herein by reference. The object includes a transponder, active or passive as a RF-ID tag, which when in the presence of an electromagnetic zone created by the reader broadcasts an object identity signal. The reader senses and decodes the broadcast signal to identify the object. The object identity is achieved by a connectionless communication that is a connection without a logical connection between the reader and the object.

The rising use of RF-ID tags promotes standardization efforts to establish a broadly applicable communication framework between RF-ID tag readers and RF-ID tags. Such a standard is established by European Computer Manufacturers Association (ECMA) International, Geneva, Switzerland in a near field communication standard (ECMA-340) dated December 2002. The standard defines communication modes for a near field communication interface and protocol (NFCIP-1) to be used for RF-ID tag readers and RF-ID tags. It also defines both passive and active communication modes to realize a communication network using near field communication enabled devices for networked products and also for consumer equipment. The standard specifies, in particular, modulation schemes, codings, transfer speeds, and frame format of a Radio Frequency/High Frequency (RF/HF) interface, as well as initialization schemes and conditions required for data collision control during initialization. Furthermore, the ECMA Standard defines a transport protocol including protocol activation and data exchange methods.

The aforementioned RF-ID tag reader and RF-ID tag communication is covered in a first approach, as shown in FIG. 5, by the passive communication mode between a phone 1 and a RF-ID tag 700. Correspondingly in a second approach, the active communication mode relates to communications between RF-ID tag readers. The state of the art communication between RF-ID tags readers will be enlightened in view of FIG. 5., wherein a second portable terminal 2 is provided which is connected to a RF-ID tag reader. The RF-ID tag reader may be realized as a stand-alone unit which may be detachably connected to the portable terminal 2 or which may be embedded in the portable terminal 2. Both the RF-ID tag readers of portable terminal 1 and the portable terminal 2 support the active communication mode which means, that the both RF-ID tag readers are adapted to communicate with each other by employing the aforementioned near field communication interface and protocol (NFCIP-1) standard. During active communication mode one of the participating RF-ID tag readers of the portable terminal 1 and portable terminal 2 actively simulates a RF-ID tag whereas the other one actively simulates a RF-ID tag reader. The data communication is established via the wireless communication link 6, which is a radio and high frequency (RF/HF) communication link, respectively. This wireless communication link 6 provide data flow between the application 400 operated on the portable terminal 1 and an application 410 operated on the portable terminal 410.

But in contrast to passive RF-ID tags which are energized by the interrogation signal of the RF-ID tag reader, both participating RF-ID tag readers are always energized independently, i.e. have their own power supply to generate the radio/high frequency (RF/HF) signals used for data communications between those. Therefore, the RF-ID tag reader, which actively simulates a RF-ID tag, may be regarded as an active RF-ID tag.

Despite the advantages provided by the RF-ID tag readers intercommunication several drawbacks of the aforementioned explanation may be identified. The realization of the RF-ID tag reader—RF-ID tag reader intercommunication requires a great effort in development since the interface and protocol definitions are sophisticated and show a significantly complex functionality which is of course required to ensure interoperability between RF-ID tag readers of different manufacturers. Moreover, the realization of the RF-ID tag reader—RF-ID tag reader intercommunication requires energy supply to each participating RF-ID tag reader, which can be problematic in view of portable devices, powered by batteries or accumulators. And in certain circumstances the operation of a portable device is not wanted or even forbidden for example in airplanes or in hospitals. Assume a RF-ID tag reader embedded in a cellular telephone wherein the embedded RF-ID tag reader supports RF-ID tag reader—RF-ID tag reader intercommunication and the user of this cellular telephone wants to establish intercommunication with a fixed RF-ID tag reader. Due to the fact that the embedded RF-ID tag reader has to be energized, intercommunication is not possible in these aforementioned circumstances since the energizing of the embedded RF-ID tag reader results in an unwanted or forbidden energizing of the cellular phone. Comment: This was a very good point!

Furthermore, RF-ID tag reader—RF-ID tag reader intercommunication competes with well established short range communication standards such as Bluetooth which are implemented in numerous state of the art portable terminals. The implementation of competing communication solutions offering comparable functionality is not economical, especially when considering that the implementation of support of RF-ID tag reader—RF-ID tag reader intercommunication is a complex undertaking. However, a RF-ID tag reader with transponder functionality, which simulates a RF-ID tag while another RF-ID tag reader simulates a tag reader, provides enhanced communication between terminals, particularly when the terminals are mobile deices.

What is needed in the art is a Bluetooth terminal having (1) shortened terminal discovery and user identification time via a connectionless connection to another terminal or access point using RF-ID, the terminal or access point establishing a session enabling the terminal to conduct transactions with an interactive service application, and (2) an advanced reader device for radio frequency (RF) identification which is at least adapted to communicate with a radio frequency identification transponder and which is able to provide radio frequency identification transponder functionality also during unpowered conditions.

Prior art related to short range communication systems and RF-ID includes:

1. PCT Publication WO01/39108 A1, published May 31, 2001, discloses a system that includes a mobile communication unit wherein a RF-ID identification module is added between the radio part and an antenna in a mobile telephone that includes a Bluetooth function. The module comprises a mixer for transposing identification messages from identification devices in a 2.45 GHz RF-ID system of the backscatter type to a baseband for further processing in a computer part of the unit. The unit may communicate with a super ordinate system, via a standard call channel or Bluetooth channel. The unit is also cabled to send information to the identification devices for alerting or transmitting data, wherein modulation and encoding can be effected in accordance with the Bluetooth standard enabling the mixer to be included as an integral part of a standard Bluetooth radio.

2. PCT Publication WO01/45038 A2, published Jun. 21, 2001, discloses a short-range communication system includes an interrogator, which interrogates multiple transponders located on a person and receives information separately from the transponders. The interrogator and/or the transponders may be held in an article of clothing or in personal effects of the person. The system enables the close worn by a person to communicate with a plurality of items and to obtain useful information. The network system may be configured so that any particular transponder may communicate with another transponder or a group of transponders of other locals to activate functions; cause action to otherwise shared data and/or information.

3. PCT Publication WO01/45319 A1, published Jun. 21, 2001, discloses a first short-range radio link operating within a first link range. The first link is between a stationary unit and a mobile communication device in a wireless network where the stationary unit transmits an interrogation signal to the communication device, via a short-range communication link operating within a second link range, essentially smaller than the first link range. The mobile communication device receives the interrogation signal from the stationary unit and transmits a response signal, including a unique identification number of the mobile communication device to the interrogation signal. The stationary unit receives the response signal and authenticates the identification number. The stationary unit and the mobile communication device establish a connection, via the first short-range radio link.

4. US Publication 20030114104, published Jun. 19, 2003 discloses a method and system for identifying when a first device is within a physical range of a second device, the second device is to establish substantive communications with. The method includes sensing which particular first device is within a physical range of the second device, and establishing substantive communications with the particular first device.

5. JP 2001-278495 2001-09-13, Application No. JP0209325 JP, Filed 20020912, entitled Information Processing Apparatus and Method A1 Published 20030327 discloses an information processing apparatus and method capable of easily and rapidly starting radio communication. When a cellular telephone is placed in the vicinity of a personal computer, a strap ID is provided from a non-contact IC tag of a cellular telephone strap to a reader/writer) of the personal computer. The personal computer has a table of correspondence between the strap ID and the Bluetooth device name of the cellular telephone. Upon acquisition of a strap ID, the personal computer references the correspondence table and identifies the cellular telephone as a communication partner of the Bluetooth communication. The personal computer identifies the cellular telephone by referencing the Bluetooth device name among a plurality of Bluetooth devices including the cellular telephone and performs Bluetooth communication with the cellular telephone.

None of the prior art discloses or suggests (1) a Bluetooth terminal having a RF-ID identification for establishing a connectionless communication with a service application and conducting transactions with the application on a session basis where the connection time and user identification time are shortened relative to the standard Bluetooth terminal discovery process for conducting sessions, and (2) a reader device included in or coupled to the terminal and adapted to operate in: (A) a reader operation mode and a transponder operation mode, the reader device supporting the near field communication (ECMA-340) standard; (B) a transponder mode or passive mode during periods of time, within which the reader is not energized and (C) operate automatically in a transponder operation mode during periods of time, within which the reader device is not energized.

SUMMARY OF THE INVENTION

To overcome limitations in the prior art described above, and to overcome other limitations that will be apparent upon reading and understanding the present specification, the present invention is directed to: (1) shorten session set-up and identification time for interactive services over a short range radio link connection, more particularly Bluetooth connection, and (2) an advanced RF-ID tag reader with transponder functionality capable of simulating a RF-ID tag while in a powered down state. The terminal incorporates a RF-ID tag incorporating a Bluetooth terminal serial number and optionally a user ID. The RF-ID tag can be a passive or semi-passive tag. In the case of a semi-passive tag, it is possible to process information before transmission of any messages. This enables transmission of other valuable information such as Bluetooth clock information. If the Clock Offset value is transmitted with Bluetooth serial number, a subsequent paging protocol is faster. When the terminal enters the field of a combined RF-ID reader and Bluetooth access point (RF-ID/BTH), the Bluetooth serial number and other optional parameters are read from the RF-ID tag incorporated into the terminal. A terminal control circuit included in the terminal and responsive to a processor is informed about the detected interrogation signal. The terminal control circuit performs a determination to determine whether a Bluetooth connection is acceptable. A "No" determination causes the terminal control circuit to instruct the Bluetooth module to enter into a non-connectable mode. A "Yes" determination causes the terminal control circuit to instruct the Bluetooth module to enter into a page scanning mode. The RF-ID reader transfers the device serial number and other optional parameters to the access node. A Bluetooth paging operation can then be initiated by the access node using the Bluetooth serial number received from the RF-ID reader. In response to the page, the terminal performs a connection setup with the access node using normal Bluetooth session set-up procedure. If the Bluetooth clock information is also transmitted, the page can be made even faster, because the access node can use the terminal's clock information in Bluetooth paging procedure. Alternatively, the access node performs a service notification that includes links to local services. By transmitting the user-ID and other optional parameters, the service notification can be personalized. The paging process shortens the session setup time as compared to the normal Bluetooth terminal discovery process for establishing a session. The system can also be used in communication between two Bluetooth terminals if the terminals are respectively equipped with a RF-ID tag and a RF-ID reader. The reader device associated with the terminal is capable to serve as a radio frequency identification transponder, and comprises a reader logic unit a radio/high frequency (RF/HF) interface and an antenna. The reader device is adapted to communicate at least with radio frequency identification transponders in a reader operation mode. The reader device comprises additionally a transponder logic unit. The transponder logic unit is connected to the reader device and in particular to the radio/high frequency (RF/HF) interface such that the reader device acts as a radio frequency identification transponder in a transponder operation mode. In particular, the transponder logic unit is adapted to communicate with other reader devices for radio frequency identification transponders. The reader device for radio frequency identification transponders can be attached, connected, implemented and/or embedded in electronic device and particularly portable electronic devices, respectively.

In addition to the Bluetooth standard, the invention also applies to other wireless standards. The invention applies, for example, to the IEEE 802.11 Wireless LAN standards, the Japanese 3rd Generation (3G) wireless standard, the various 2G, 2.5G, and 3G cellular telephone system standards, the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the High Performance Radio Local Area Network (HIPERLAN) standard, and the Multimedia Mobile Access Communication (MMAC) Systems standard of the Japanese Association of Radio Industries and Businesses. For each of these standards, the initialization parameters for establishing a communications session between a terminal and an access point are stored in a RF-ID tag accompanying the terminal. The parameters are transferred to the RF-ID reader at the access point using RF-ID technology, thereby speeding up the process of initialization.

DESCRIPTION OF THE DRAWINGS

The invention will be further understood from a detailed description of a preferred embodiment taken in conjunction with an appended drawing, in which.

DESCRIPTION OF PREFERRED EMBODIMENT

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
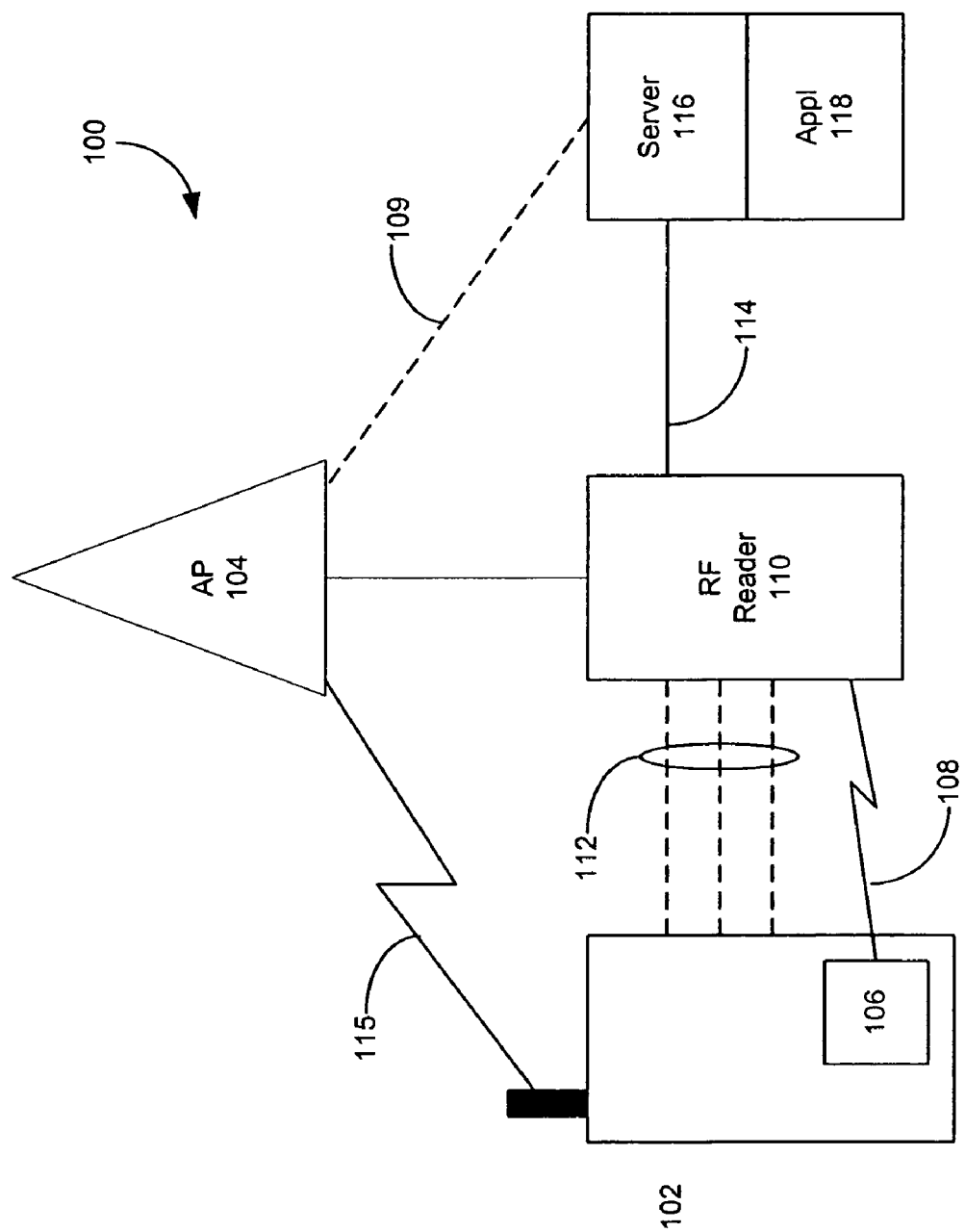
FIG. 1 is a representation of a Bluetooth terminal within the field of RF-ID reader providing a connectionless communication to an access point in a Bluetooth network for conducting transactions between the terminal and a service application on a sessions basis and incorporating the principles of the present invention, as follows.

FIG. 1 discloses a system 100 incorporating principles of the present invention for RF-ID based discovery of Bluetooth terminals, which shortens the user identification time and speeds up session setup for interactive services between a terminal and a service application. The terminal 102 incorporates a RF-ID tag 106, which stores ID information, such as the Bluetooth terminal serial number of the terminal 102. The ID information including at least the Bluetooth serial number of the user terminal is transmitted by the RF-ID tag 106 via a radio link 108 to a RF-ID Reader 110.

In one embodiment, the RF-ID tag 106 may be a passive tag, which operates without an internal battery source, deriving the power to operate from the radio field 112 generated by the RF-ID reader 110. The Bluetooth terminal serial number is transmitted by the RF-ID tag 106 to the RF-ID reader 110, and can be forwarded to a server 116. Alternately, the RF-ID reader 110 can transfer the identity information to an access point 104, which can forward the identity information to the server 116. The server 116 can use the received terminal serial number or user ID to lookup information about either the user or the terminal 102, and return the accessed information to the access point 104 for transfer to the terminal via radio link 115.

In another embodiment, the RF-ID tag 106 can be a semi-passive or active tag. A semi-passive or active tag may include a read/write storage device powered by an internal battery allowing a greater RF communication range and higher data transmission rates. In the case of a semi-passive tag, it is possible to process information before message transmission. This enables transmission of other valuable information such as the Bluetooth Clock Offset of the terminal 102. If the Clock Offset value of the terminal 102 is transmitted with the Bluetooth serial number, the subsequent Bluetooth paging protocol with the access point 104 is faster.

When the terminal 102 enters the radio field 112 of a combined RF-ID reader 110 and Bluetooth access point 104 (RF-ID/BTH), the Bluetooth serial number and other optional parameters are read by the reader 110 from the RF-ID tag 106. If the terminal has a passive tag there is no option to update the tag information, so the information preferably includes only Bluetooth serial number of the terminal, which may be hard-coded within the RF-ID tag already in the terminal manufacturing line. In the case of semi-passive or active RF-ID tag, the tag information can be updated later on, so more information, such as Clock Offset information and User ID information can be maintained in the tag.

Figure 1B:
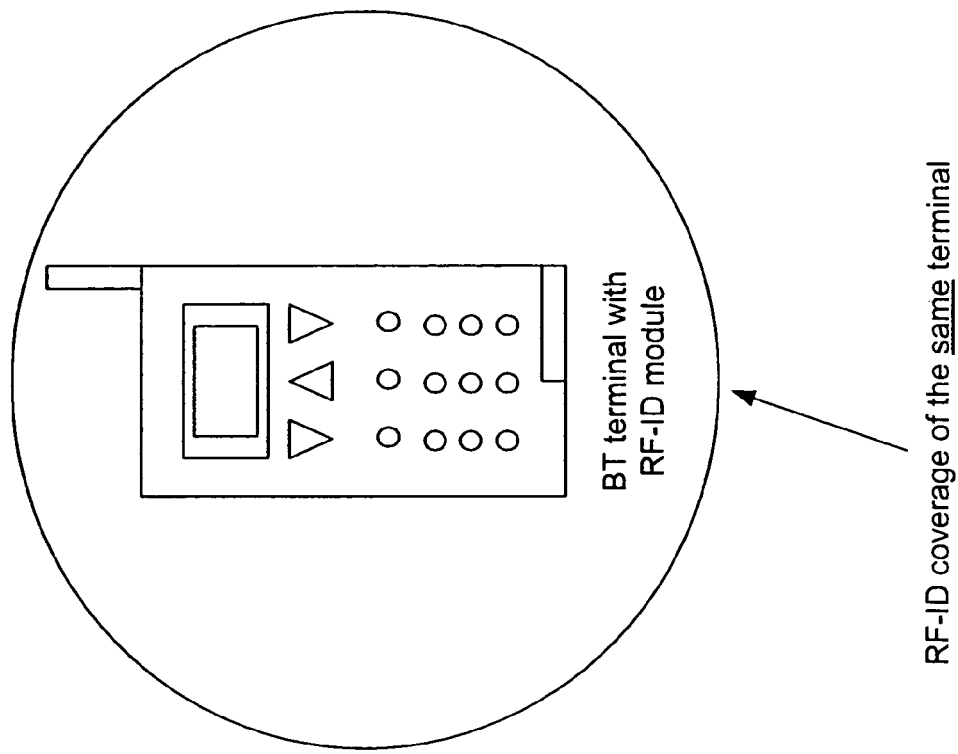
FIG. 1B is a representation of RF-ID coverage of the Bluetooth terminal of FIG. 1A.
Figure 1A:
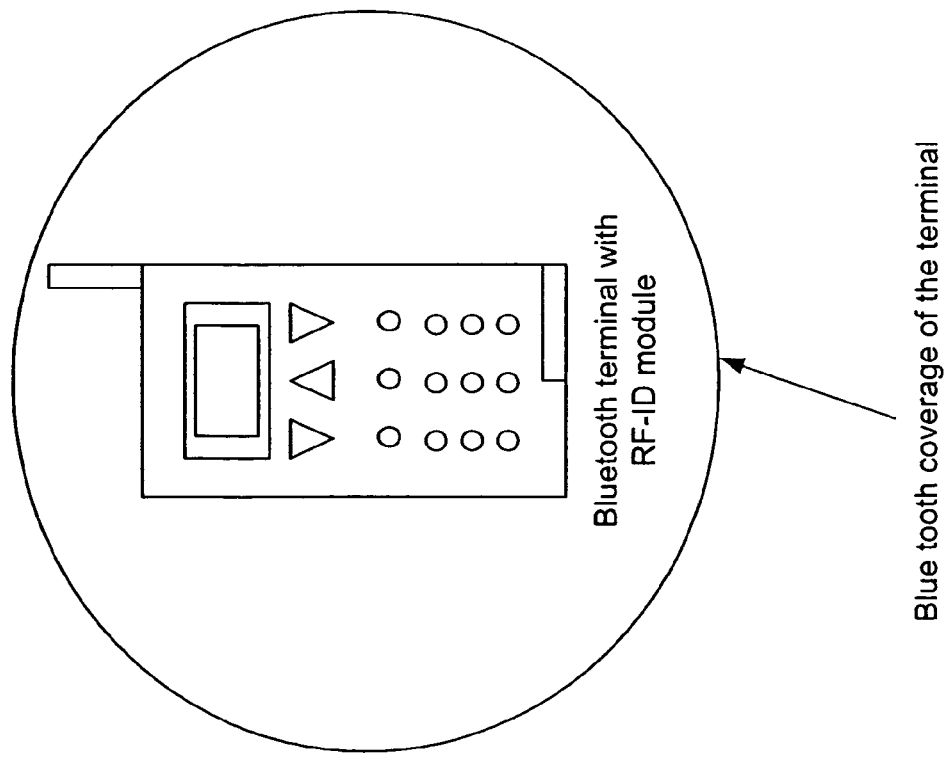
FIG. 1A is a representation of a RF coverage area for a Bluetooth terminal with a RF-ID module.
Figure 1C:
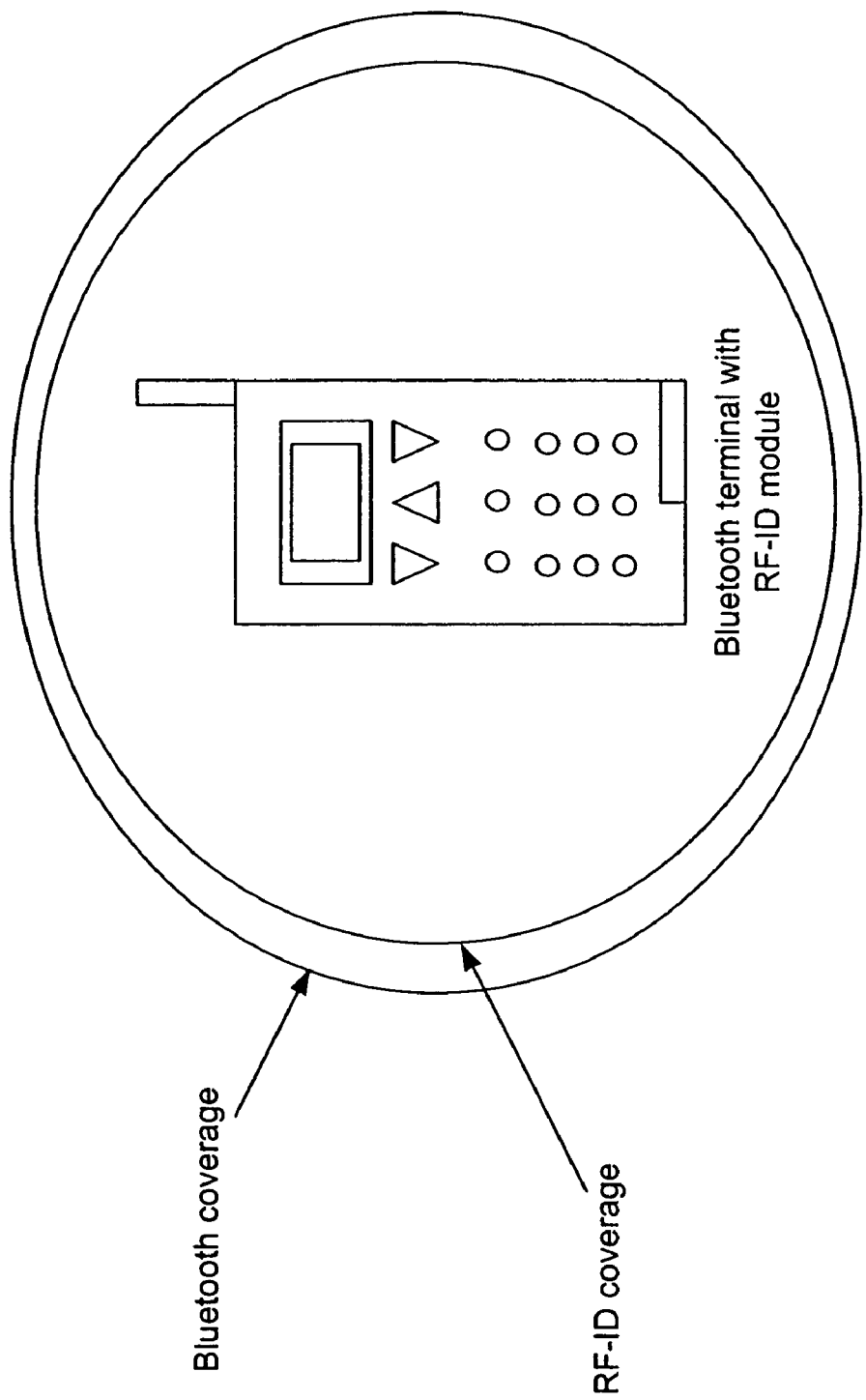
FIG. 1C is a representation of the Bluetooth coverage and RF-ID coverage of the Bluetooth terminal of FIGS. 1A and B.

According to a preferred embodiment of the present invention, the RF coverage area of the RF-ID tag and the RF coverage area of the Bluetooth terminal are substantially the same (or at least in magnitude). FIG. 1A illustrates the Bluetooth RF coverage of the terminal. FIG. 1B illustrates RF-ID coverage of the same terminal. In FIG. 1C, the coverage areas of FIGS. 1A and B are "put together" and are substantially the same (in the optimum case) thereby requiring the RF-ID readers to send interrogation signals having coverage in the same magnitude as that of the Bluetooth terminal coverage and requiring the RF-ID tag to have the same coverage as the terminal. The combined RF-ID reader 110 and Bluetooth access point 104 may also periodically send Bluetooth Inquiry messages to detect the terminal 102. After receiving the Bluetooth serial number and other optional parameters by whatever means (using RF-ID or Bluetooth), the combined RF-ID reader instantly sends a Bluetooth paging message using the received information. It should be noted that according to various embodiments of the present invention, the coverage areas of Bluetooth and RF-ID may be significantly different, and the present Patent Application shall not be limited to any specific coverage areas.

Returning to FIG. 1, the RF-ID reader 110 transfers the device serial number; the terminal Clock Offset value, and other optional parameters including the Clock Offset value depending upon whether the terminal has a passive or a semi-passive RF-ID tag to the access node 104. The access point now has enough information about the terminal 102 to skip the usual Bluetooth inquiry stage in establishing a Bluetooth connection, and can proceed directly to the Bluetooth paging stage. A Bluetooth paging operation is initiated by the access node 104 using the Bluetooth serial number of the terminal 102 received from the RF-ID reader and possibly the Clock Offset value of the terminal 102. In response to the page, the terminal 102 performs a connection setup with the access point 104 using normal Bluetooth session set-up procedure. Additionally, the access point 104 can send a service notification to the server 116 to access data, such as links to local services. By transmitting user-ID or the serial number of the terminal 102, the service notification to the server 116 can be personalized, and data uniquely associated with the user can be accessed. The RF-ID discovery/paging process shortens the session setup time as compared to the normal Bluetooth terminal discovery process for establishing a session. The system can also be used in communication between two Bluetooth mobile terminals, if the terminals are respectively equipped with a RF-ID tag 106 and a RF-ID reader 110.

The access point 104 uses the information transferred from the RF-ID reader 110 to prepare and send a paging message to the terminal 102. The access point 104 invokes its link controller to enter a page state where it will transmit paging messages to the paged terminal 102 using the access code acquired from the RF-ID tag 106. The terminal 102 Bluetooth communication module is correspondingly set into page scanning state in response of detecting the interrogation signal from the access point 104, and therefore it can receive the paging message from the access point 104, which provides the terminal 102 with the access point's clock timing and access code. When the access point 104 sends a paging message to the terminal, a Frequency Hopping Synchronization (FHS) packet which includes the terminal's address is transmitted to enable the terminal 102 to synchronize itself with the access point 104. The terminal 102 responds to the page with an acknowledgement packet, whereupon, the two devices form a synchronous connectionless link (ACL) and the access point 104 and terminal 102 transition into the connection state. Since the access point has initiated the page, it will be the master device and the terminal device will become the slave to the access point. Additional details for establishing the connection between the terminal and the access point are described in "The Bluetooth Special Interest Group, Specification Of The Bluetooth System", Volumes 1 and 2, Core and Profiles: Version 1.1, 22Feb., 2001.

The communications between the terminal 102 and access point 104 are passed through the reader 110, via a connection 114 to the server 116, which executes a service application 118. Alternatively, the access point 104 may communicate directly with the server 116 via a wired or wireless connection 119. The terminal 102 and the service application 118 interact, via the standard Bluetooth message protocols described in "The Bluetooth Special Interest Group, Specification Of The Bluetooth System", Volumes 1 and 2 supra.

The terminal messages are processed by the application 118. In one embodiment the messages between the terminal 102 and the application 118 are exchanged using the Wireless Access Protocol (WAP), allowing mobile terminals to use data services and providing access to the Internet. WAP supports a client/server architecture. WAP enabled client devices can use micro browsers, which are specially designed web browsers that fit into mobile devices, such as a mobile cellular handset. A micro browser is designed to work with a small screen and use less memory than a browser running on a desktop computer. Additional information about the WAP standard and the WAP client/server architecture can be found in the book by Charles Arehart, et al. entitled, "Professional WAP", published by Wrox Press Ltd., 60610 (ISBN 1-866124-04-1).

Figure 2A:
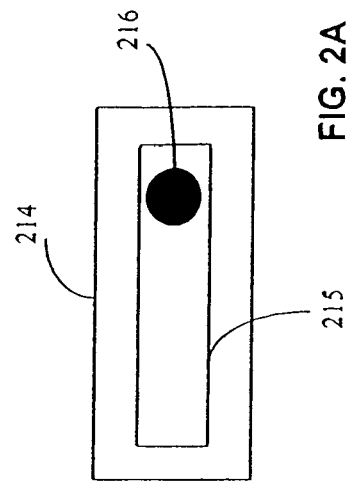
FIG. 2A is a representation of the passive tag of FIG. 2.
Figure 2:
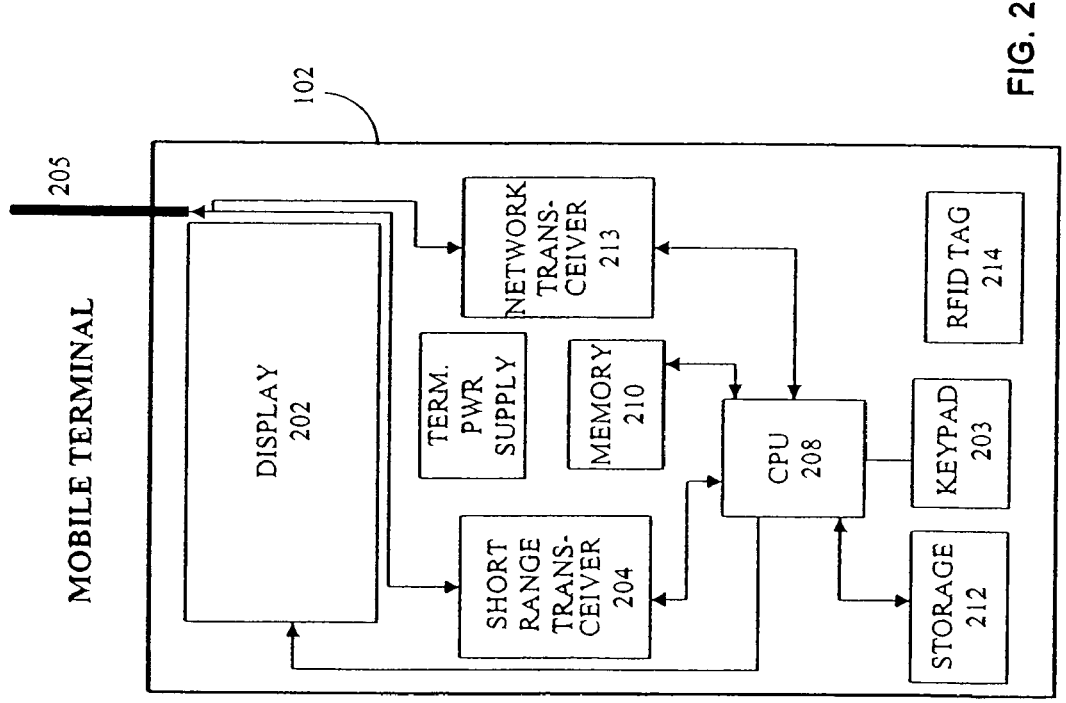
FIG. 2 is a representation of a Bluetooth terminal, including a passive RF-ID tag, according to one embodiment of the invention.

FIG. 2 is a functional representation of the mobile terminal 102 according to one embodiment of the present invention. Included in the terminal 102 is a display 202 for displaying messages received from the access point 104 or other terminal and entering messages and data via a keypad 203 for transmission to the access point or other terminal. A short-range transceiver 204 linked to an antenna 205 provides communication over a Bluetooth network for messages and data. It should be noted that the antenna used in short-range communication is not the same antenna used in communication with a mobile network. The transceiver 204 interacts with a CPU 208 for implementing Bluetooth protocols and processing messages exchanged between the access point 104 and the terminal 102. The CPU 208 is linked to a volatile or dynamic random access memory (DRAM) 210 containing an operating system for processing messages, protocols, etc. The CPU 208 executes programs stored in a non-volatile or read only memory 212 providing instructions for managing and controlling the operation of the terminal 102. The CPU 208 is also connected to a cellular telephone network transceiver 213 for interacting with a cellular network, such as the Global System Mobile (GSM) and the like via the antenna 205. In accordance with the invention, a RF-ID tag 214 is installed in the terminal 102. In one embodiment, the tag may be a passive device which operates without an internal battery source, deriving the power to operate from the field 112 generated by the RF-ID reader 110 which is inductively coupled to the passive tag. Passive tags have typically a shorter reading range and require a higher-powered RF-ID reader 110. Passive tags are also constrained in their capacity to store data and in the ability to perform well in a noisy electromagnetic environment. Passive tags may contain varying amounts of information ranging from a small storage holding only an ID number to a 128 k byte memory sufficient to hold a serial identification number and parity bits. The RF-ID reader 110 communicates with the RF-ID tag 214 through the use of RF energy. The transferred data between the RF-ID tag 214 and the RF-ID reader 110 requires the data to be modulated on a carrier wave. Carriers operate in several frequency bands ranging from 612-500 kHz to 2.4-5.8 GHz. Modulation of the carriers relies upon Amplitude Shift Key (ASK), Frequency Shift Key (FSK) and Phase Shift Key (PSK).

FIG. 2A shows the passive RF-ID tag 214 in more detail. According to one embodiment, the tag comprises a radio frequency ID transponder 215, which conforms to the principles of RF-ID technology. A tag antenna 216 is connected to the transponder 215, typically a microchip using well-known coil-on-chip technology. The chip may include a user programmable E-PROM incorporating a user identification and Bluetooth serial number (BT_ADDR). The RF-ID tag 214 is capable of receiving an interrogation signal from the RF-ID reader 110 (see FIG. 1) and separating the RF energy from the received signal. The energy captured by the antenna 216 is analyzed by the microchip and is sufficient to provide a response signal to the RF-ID reader 110. The response signal includes at least the Bluetooth serial number for transfer to the access point 104 to initiate a paging operation for the terminal 102.

Figures 3, 3A:
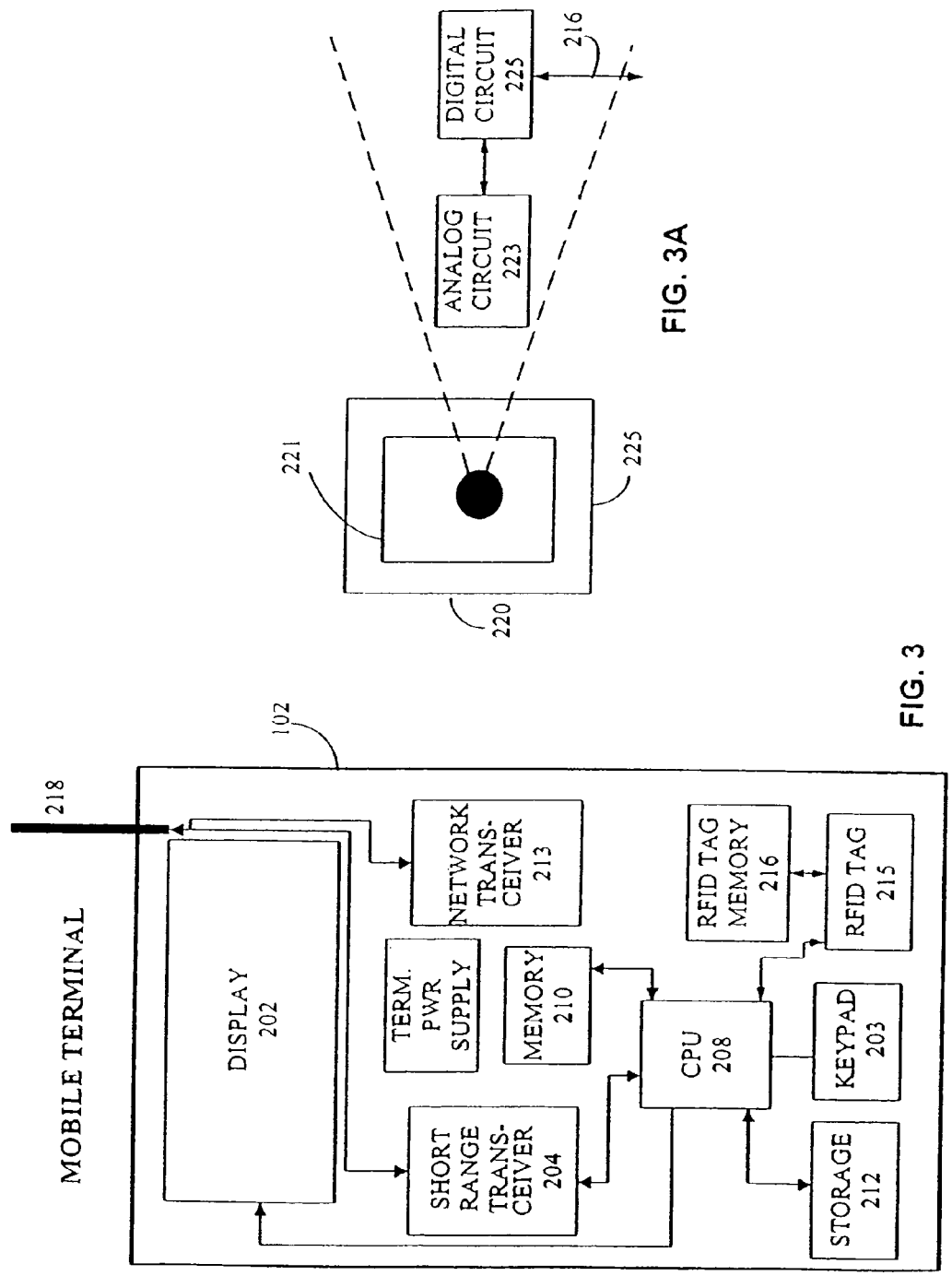
FIG. 3 is a representation of a Bluetooth terminal, including a semi-passive RF-ID tag, according to one embodiment of the invention.
FIG. 3A is a representation of the semi-passive or active tag of FIG. 3.

FIG. 3 discloses the terminal 102 of FIG. 2, except that it substitutes a semi-passive or active tag 215 for the passive tag 214. The RF-ID tag 215 may be a read/write device powered by an internal battery allowing greater communication range and higher data transmission rates. The RF-ID tag 215 is connected to a RF-ID memory 216, which may be a random access memory and/or a read-only non-volatile memory. The random access memory facilitates temporary data storage during reader interrogation and response. The read-only memory stores the operating system and contains instructions related to terminal operation. The RF-ID tag 215 is connected to the CPU 208 for receiving the Bluetooth Clock Offset data of the terminal 102 and other possibly stored data required by the access point 104 in establishing a Bluetooth connection. In the case of a semi-passive RF-ID tag, the tag after receiving an interrogation signal may activate the Bluetooth module of the user terminal and set it to page scanning mode.

FIG. 3A shows the RF-ID semi-passive tag 215 in greater detail. An antenna film or coil 220 is connected to a microchip 221 including a power supply (not shown) and analog circuit 223 for converting the RF signals from the RF-ID reader 110 into digital signals for processing by digital circuitry 225 in reading and writing data into the tag memory 216. The tag 215 communicates with the CPU 208 for updating information within the tag, e.g. Clock Offset information. Also, The tag 215 may allow the RF-ID reader 110 to alter the data stored in the RF-ID tag 215 by writing into and reading from the tag memory 216.

Figure 4:
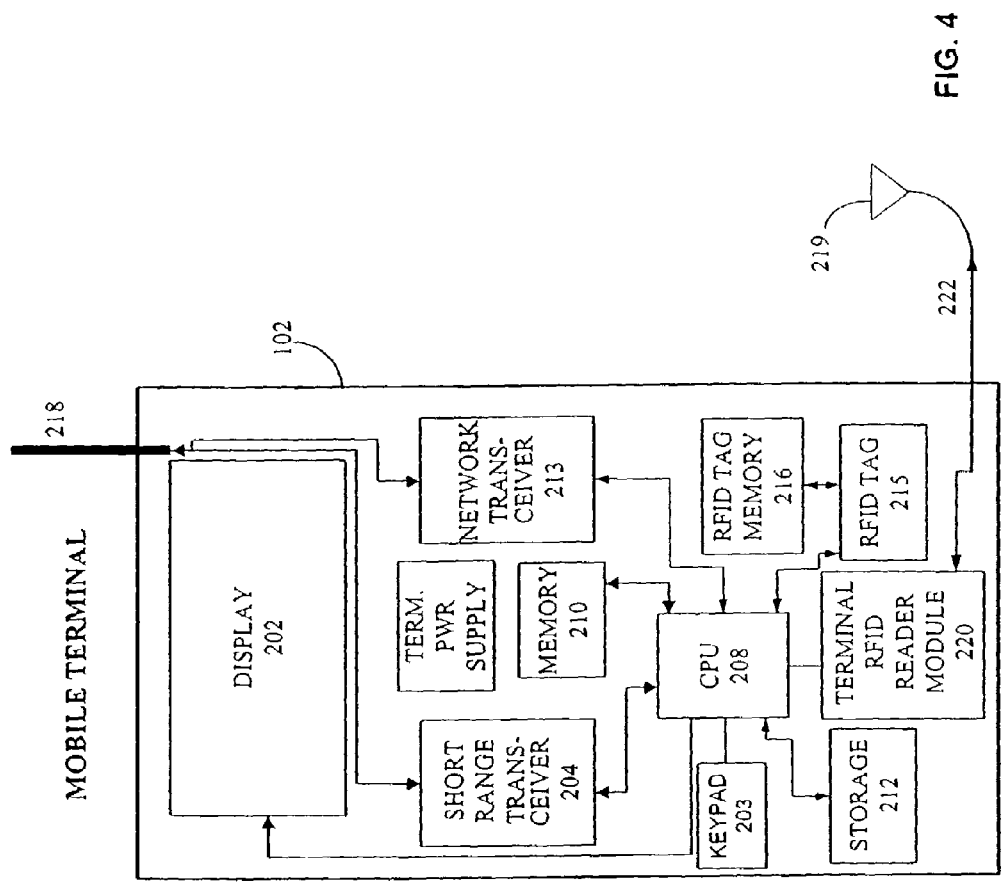
FIG. 4 is a representation of Bluetooth terminal including a RF-ID reader module for exchanging information with other RF-ID equipped devices according to one embodiment of the invention.

FIG. 4 shows the terminal 102 of FIG. 3 further including a terminal RF-ID reader module 220 connected to the CPU 208. The terminal 102 may use the reader module 220 using e.g. an internal battery (not shown) as a power source to transmit an interrogation signal via the antenna 219 for receiving the Bluetooth serial number and possibly other information, such as Bluetooth Clock Offset information of other terminals within proximity to the reader module 220. The module disables the RF-ID tag 215 when sending the interrogation signals to other handheld terminals. The electromagnetic coupling of the terminal 102 and the other terminals and the RF-ID reader 110 (FIG. 1) allows non-line-of-sight communication between the terminals and with the RF-ID reader.

Figure 5A:
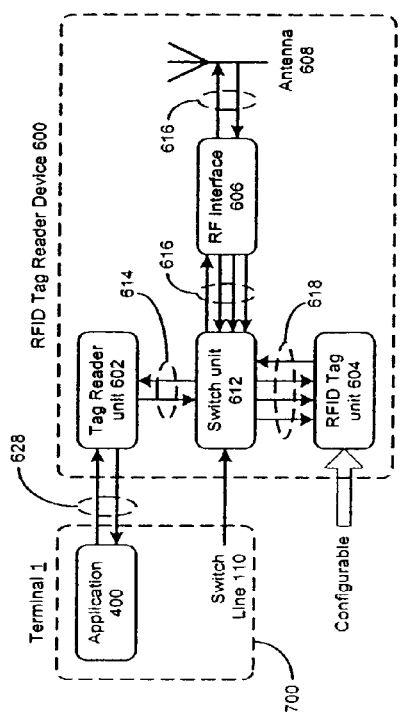
FIG. 5A depicts a block diagram illustrating function units of a RF-ID tag reader according to an embodiment of the invention.
Figure 5:
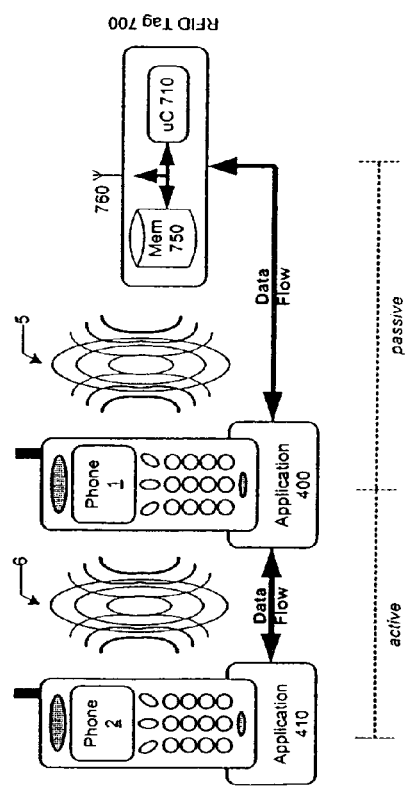
FIG. 5 depicts a block diagram illustrating state of the art communication between a RF-ID tag reader and RF-ID tags.

To enlighten state of the art for RF-ID tags and RF-ID tag readers, FIG. 5 shows a schematic block diagram to describe state of the art use of RF-ID tags and RF-ID tag readers.

In a first approach, the state of the art communication between RF-ID tags readers and RF-ID tags will be enlightened. The block diagram shows a portable terminal 1 which operates an application 400 and which has tag reader capability such that data flow is established between a RF-ID tag 700 and the application 400. The portable terminal 1 is any electronic terminal device, which is adapted to communicate with a RF-ID tag 700.

The portable terminal 1 is connected to a RF-ID tag reader to enable communications between application 400 operated on the portable terminal 1 and the RF-ID tag 700. The RF-ID tag reader may be realized as a stand-alone unit which may be detachably connected to the portable terminal 1 or which may be embedded in the portable terminal 1.

The RF-ID tag 700 illustrated in FIG. 5 includes a storage component (Memory) 750 and a microprocessor (µP) or microcontroller (µC) 710. An antenna 760 allows the RF-ID tag-700 to receive an interrogation signal and to transmit a response signal e.g. on receiving of such an interrogation signal. The storage component 750 contains the RF-ID tag information that comprises in accordance with the present invention at least a tag identification sequence, which is suitable to address a plurality of individual services. An interrogation signal and a response signal are communicated with the portable terminal 1 via the wireless communication link 5 which is a radio frequency (RF) communication link, or depending on the deployed frequency actually a high frequency (HF) communication link. The coupling of RF-ID tag reader and RF-ID tag is preferably inductive. The storage component 750 may be one of a read-only or a read/write (i.e. random access) storage component embodied as volatile or non-volatile memory. In case of a read-only storage component the RF-ID tag reader is allowed to retrieve stored information, whereas in case of read/write storage component the RF-ID tag reader may be allowed to read information and to write information. The communication link established between RF-ID tag reader and RF-ID tag 700 allows for an application 400 operated on the portable terminal 1 transmitting one or several commands to the RF-ID tag 700 to request information, which is answered by RF-ID tag 700 by a corresponding response comprising the requested information. The received request information is supplied to the originally requesting application 400 to be processed. The one or several commands may be simply the interrogation signal or may be embedded in the interrogation signal by modulation. The RF-ID tag reader establishes a data flow between RF-ID tag 700 and application 400.

FIG. 5A shows a diagram of functional blocks, which allow realizing a RF-ID tag reader device 600 with RF-ID tag functionality according to an embodiment of the present invention. The illustrated RF-ID tag reader device 600 includes a RF-ID tag reader unit 602 which shall represent the RF-ID tag reader functionality and a RF-ID tag unit 604, which shall represent the RF-ID tag functionality. Both functional units, i.e. the RF-ID tag reader unit 602 as well as the RF-ID tag unit 604, require a radio frequency (RF) interface (and a high frequency (HF) interface, respectively) and an antenna adapted to the radio frequency (RF) deployed for operating. The embodiment illustrated in FIG. 5A shows a common RF interface 606 and a common antenna 608 used by both functional units. It shall be understood that the radio frequency interface such as interface 606 as well as the antenna such as antenna 608, which are presented in the present description according to embodiment of the invention, are adapted to employ any suitable radio frequency used in the field of RF-ID tags and transponders, respectively. In particular, at least typical operation frequencies aforementioned shall be implementable with embodiments of the present invention.

In case of RF-ID tag reader functionality, the antenna 608 is adapted to transmit one or more interrogation signals and to receive one or more response signals for retrieving information from a RF-ID tag. In view of the aforementioned near field communication standard (ECMA-340), the antenna 608 may be adapted to allow communication in accordance with the standard.

Depending on the capability of the RF-ID tag reader unit 604, the antenna is adapted to communicate with a RF-ID tag in passive communication mode and with another RF-ID tag reader device 600 in active communication mode.

In case of RF-ID tag functionality the antenna 608 is adequate to receive one or more interrogation signals and to transmit one or more response signals carrying information retrieved from the RF-ID tag unit 604.

The antenna 608 is connected to the RF interface 606 via one or more signal connections 610 which supplies RF/HF signals generated by the RF interface 606 to the antenna 608 and which accepts RF/HF signals received by the antenna 608.

The RF interface 606 is responsible for both modulating and demodulating the signals to be transmitted and received by the antenna 608, respectively. Therefore, the RF interface 606 couples to the RF-ID tag reader unit 602 and the RF-ID tag unit 604, respectively. In particular, the RF interface 606 receives from the RF-ID tag reader unit 602 signals to be modulated and transmitted and transmits demodulated signals to RF-ID tag reader unit 602. The RF interface 606 also transmits demodulated signals to the RF-ID tag unit 604 and receives signals from the RF-ID tag unit 604 to be modulated and transmitted. More particularly, the RF interface provides further signals necessary for the operation of the RF-ID tag unit 604 which are in detail a power supply signal (voltage signal) and a clock signal. The power supply signal is gained from the coupling of the interrogating electromagnetic field whereas the clock signal is obtained from the demodulator included in the RF interface. The power supply signal and the clock signal are obligate for operating the RF-ID tag unit 604 as a passive RF-ID tag energized by interrogating signal of a RF-ID tag reader device.

The RF-ID tag reader device 600 illustrated in FIG. 5A comprises a switch 612, which is operated to switch between RF-ID tag reader functionality and RF-ID tag functionality. The switch 612 is interposed between RF-ID tag reader unit 602, RF-ID tag unit 604 and RF interface 606 and operated with a switching input to which a switching signal is provided via a switching line 110. In detail, signal connections 614 carry at least signals generated by the RF-ID tag reader unit 602 to be modulated by the RF interface 606 and to be transmitted by the antenna 608 and signals received by the antenna 608 and demodulated by the RF interface 606 to be supplied to the RF-ID tag reader unit 602. The signal connections 614 are switched by the switch 612 to the RF interface 606 connected to the switch 612 via signal connections 616.

Analogously, signal connections 618 carry at least signals received by the antenna 608 and demodulated by the RF interface 606 to be supplied to the RF-ID tag unit 604 and signals generated by the RF-ID tag unit 604 to be modulated by the RF interface 606 and to be transmitted by the antenna 608. The signal connections 618 are switched by the switch 612 to the RF interface 606 connected to the switch 612 via signal connections 616. The aforementioned power supply signal and clock signal are supplied from the RF interface 606 to the RF-ID tag unit 604 via the switch 612 and may be part of the signals transmitted via the signal connections 616 and signal connections 618.

Depending on the switching state or position of the switch 612, either the RF-ID tag reader unit 602 is coupled to the RF interface 606 or the RF-ID tag unit 604 is coupled to the RF interface 606. In the former case RF-ID tag reader functionality is available whereas in the latter case RF-ID tag functionality is available.

The RF-ID tag reader device 600 and hence the RF-ID tag reader unit 602 is provided with an interface indicated by communication connections 620 to allow an application 400, which is operated on a portable terminal 700 comparable to portable terminals 1 or 2, communicating with the RF-ID tag reader device 600 and in particular with the RF-ID tag reader unit 602, respectively, as shown in FIG. 5 The interface interfacing between RF-ID tag reader device 600 and application is established by appropriate hardware and software interfaces that allow access of the application 400 to the RF-ID tag reader device 600.

Referring back to near field communication standard (ECMA-340), the purposed RF-ID tag reader functionality and the RF-ID tag functionality as described above in view of an embodiment illustrated by functional units depicted in FIG. 5 establish a further communication mode additional to the standardized passive and active communication mode.

As described in detail above, the field communication standard (ECMA-340) addresses the operation of RF-ID tag reader devices and provides the active communication mode, which is used preferably in communication with one or more RF-ID tags. Additionally, the field communication standard (ECMA-340) provides the passive communication mode, which is intended for communication with another RF-ID tag reader device. Both the active and passive communication modes require necessarily energizing of the communicating RF-ID tag reader device via a power supply. In case of the active communication mode, the necessity of a power supply is obvious since communication with one or more passive RF-ID tags requires energizing of the passive RF-ID tags via one or more interrogating signals of the communicating RF-ID tag reader device.

Additionally, the active as well as passive communication modes allow operating reading functionality and writing functionality of the RF-ID tag reader device. That means, the RF-ID tag reader device having reading functionality is adapted to retrieve information stored in one or more RF-ID tags. The reading functionality is at least the basic functionality of a RF-ID tag reader device. The RF-ID tag reader device having writing functionality is adapted to add information to RF-ID tags to be stored and/or modify information stored in RF-ID tags. It shall be noted that the adding and/or modifying of information stored in RF-ID tags depends on the capability of the RF-ID tags and/or authorization of the RF-ID tag reader device. The writing functionality is an enhanced functionality of a RF-ID tag reader device.

The RF-ID tag functionality as described above in detail in view of an embodiment illustrated by functional units depicted in FIG. 5 may be employed to establish a new communication mode, which will be denoted as show communication mode. In the show communication mode the RF-ID tag functionality is switched while the RF-ID tag reader functionality is out of operation. The show communication mode is distinguished from the known communication modes therein that the RF-ID tag functionality provides the physical advantages of a passive RF-ID tag, which does not require any internal power supply. This is in clear contrast to the passive communication mode, which may be regarded as functionality, which simulates a RF-ID tag. Further, advantages addressing the implementation of the RF-ID tag functionality will become apparent in view of RF-ID tag reader devices according to embodiments of the present invention.

The information stored in the RF-ID tag unit 604 that can be retrieved by a RF-ID tag reader device 600 as illustrated above is stored in an adequate storage component. The storage component may be a read-only storage component or a configurable storage component. In case of a configurable storage component a number of storage technologies are applicable and in particular non-volatile configurable storage technologies are of interest.

It shall be assumed that the RF-ID tag reader device 600 as embodied in FIG. 5A is attached to or embedded in a portable terminal 700 such as portable terminals 1 and 2. Conventionally, the RF-ID tag reader device 600 may be provided with an interface such as a serial interface interfacing data exchanged between the RF-ID tag reader device 600 and the portable terminal 700 such that applications executed on the portable terminal 700 can use the functionality, which is provided by the RF-ID tag reader device 600. An application program interface (API) layer may support the communication between applications such as applications 400 and 410 and the RF-ID tag reader device 600.

Figure 5C:
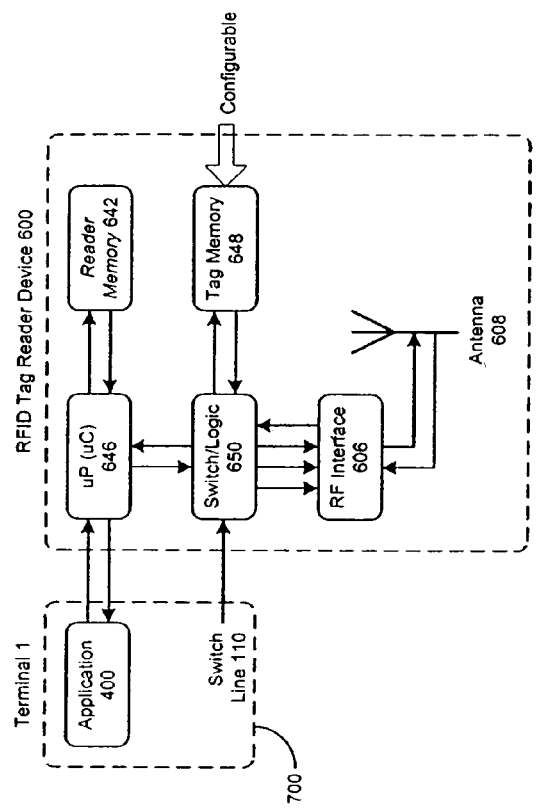
FIG. 5C depicts a block diagram illustrating an alternative embodiment of a RF-ID tag reader according to the invention.
Figure 5B:
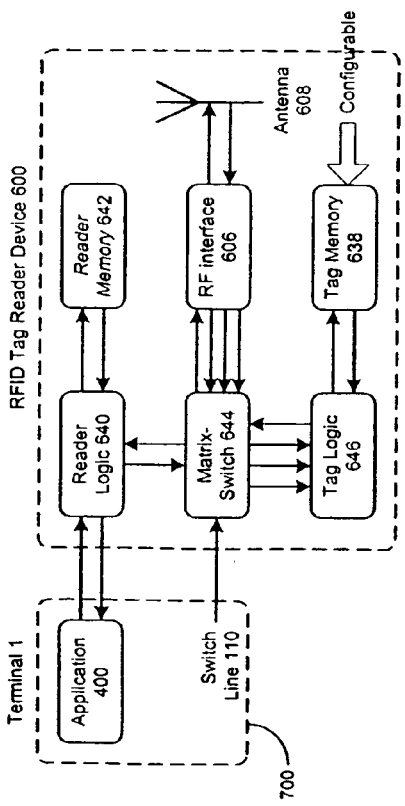
FIG. 5B depicts a block diagram illustrating an embodiment of a RF-ID tag reader according to the invention.

Whereas the operation of a RF-ID tag reader device 600 according to the embodiment has been described by the means of functional units the following FIG. 5B and FIG. 5C illustrate more detailed embodied RF-ID tag reader device.

FIG. 5B depicts a block diagram, which illustrates an embodiment of a RF-ID tag reader device according to still another embodiment of the invention.

The tag reader device 600 comprises a reader logic 640, an optional reader memory 642, a RF interface 606 and an antenna 608. These components establish a complete conventional tag reader device. With respect to the present invention, the illustrated tag reader device 600 comprises further a matrix switch 644, a tag logic 646 and a tag memory 648. The tag reader device 600 is coupled to the terminal 700 via an appropriate interface such that the application 400 can communicate with the tag reader device 600. The illustrated tag reader device 600 corresponds in its design to the arrangement of the functional units explained with reference to FIG. 5A

The antenna 608 and the RF interface 606 are common units used for RF-ID tag reader operation and for RF-ID tag operation. The matrix switch 644 is controlled via the switch line 110, which is herein supplied with switching signal by the terminal 700. Alternatively, without leaving the scope of the invention, the switching state of the switch 644 may be also controlled by the RF-ID tag reader device 600 itself, which may ensure a higher readability. In show communication mode, as defined above, the antenna 608 and the RF interface 606 are coupled via the switch 644 to the tag logic 646, whereas in all other communication modes the antenna 608 and the RF interface 606 are coupled via the switch 644 to the reader logic 640. Since the RF-ID tag functionality corresponds in its externally visible physical properties to a passive RF-ID tag, the RF interface may provide additionally at least a power supply signal and a clock signal to the tag logic 646 via the switch 644 (shown) or directly unswitched (not shown).

In show communication mode, i.e. when operating RF-ID tag functionality, the RF interface 606 forms the interface between the analogue, radio frequency transmission channel from a requesting RF-ID tag reader device to the RF-ID tag and the tag logic 646 of the RF-ID tag. The modulated RF (HF) signal from the requesting RF-ID tag reader device is reconstructed in the RF interface 606 by demodulation to create a digital serial data stream for reprocessing in the tag logic. The tag logic 646 is preferably embodied as a digital logic serving as address and/or security logic. The tag logic 606 also includes logic for a terminal control circuit (not shown) for determining whether a short-range connection, typically Bluetooth is acceptable as will be described hereinafter in connection with a description of FIGS. 9 and 9A. A clock-pulse generation circuit in the RF interface 606 generates the system clock for the data carrier from the carrier frequency of the RF (HF) field supplied by the requesting RF-ID tag reader device. The RF interface 606 may further incorporate a load modulator or backscatter modulator (or any alternative procedure, e.g. frequency divider), controlled by the digital data being transmitted, to return data to the requesting RF-ID tag reader device. Moreover the RF interface 606 draws current from the antenna 608 which is rectified and supplied to the tag logic 646 as a regulated supply voltage.

The tag logic 646 may support a passive read-only RF-ID tag implementation and a re-writeable RF-ID tag implementation. As soon as a passive read only RF-ID tag enters the interrogation zone of a RF-ID tag reader device it begins to continuously transmit information stored in the tag memory 648 associated with tag logic 646. In principle, the tag memory 648 illustrated as a separate component may be included in the tag logic 646. The stored information may comprise a tag identification number, which relates to the original purpose of the RF-ID tags. But the stored information is not limited thereto. Depending of the realization and complexity of the tag logic 646, also sophisticated operations on stored information is possible wherein the operations can be instructed by commands additionally transmitted in the interrogation zone, e.g. modulated on the interrogating signal. Typically, the communication between passive read-only RF-ID tags and the RF-ID tag reader devices is unidirectional, with the RF-ID tag sending its stored information to the RF-ID tag reader device continuously. But data transmission from the RF-ID tag reader device to the RF-ID tag is possible. A re-writeable RF-ID tag implementation that can be written with data by the RF-ID tag reader device can be realized with varying memory capacities which only depends in the implementation of the tag memory 648. Typically write and read access to the re-writeable RF-ID tag is often in blocks, which are formed by assembling a predefined number of bytes, which can then be read or written.

The tag logic 646 may be realized in a simple implementation as a state machine.

In active and/or passive communication modes, i.e. when operating RF-ID tag reader functionality, the RF interface 606 forms a transmitter and receiver.

The RF interface 606 should perform the following functions when operated in conjunction with RF-ID tag reader functionality. The RF interface 606 is adapted to generate radio/high (RF/HF) frequency transmission power serving as interrogating signal to activate RF-ID tags and supply RF-ID tags with power. Further, the RF interface 606 is adapted to modulate transmission signals on the carrier frequency to transmit data and/or instructions to the interrogated RF-ID tags and to receive and demodulate response signals transmitted back by the interrogated RF-ID tags.

The reader logic 640 may be realized as an application specific integrated circuit (ASIC) module, a microcontroller (μC), a microprocessor (μP) and the like. In order to allow communication with the terminal 700, in which the RF-ID tag reader device 600 is embedded or to which the RF-ID tag reader device 600 is attached, the reader logic 640 also provides a data communication interface such as a serial interface (e.g. a RS232 interface) to perform the data exchange between the RF-ID tag reader device 600 (slave) and the external application 400 (master) executed on the terminal 700.

The reader logic 640 may also be associated with an optional reader memory 642. Conventionally, a distinct reader memory 642 is not necessary for RF-ID tag reader functionality, but the reader memory 642 may be used as a buffer storage for communication with the terminal 700 as well as with a RF-ID tag or another RF-ID tag reader device.

In view of the present invention, the tag memory 648 may be configurable; i.e. information stored in the tag memory may be modified, added, processed and/or deleted. According to an embodiment of the invention, the configuration of the information stored in the configurable tag memory 648 may be limited to the terminal 700 and applications executed thereon. Moreover, the access to the configurable tag memory 648 may be limited to one or more specific applications executed on the terminal 700 to ensure data integrity, which may be required and necessary, respectively, depending on the kind of information stored.

The access to the tag memory 648 to configure information stored therein may be established via a dedicated interface (not shown) connecting the terminal 700 and one or more applications, respectively, executed thereon to the memory tag 648. Alternatively, the access to the tag memory 648 to configure information stored therein may be established (mediated) via the reader logic 640 and the microprocessor (μP)/ microcontroller (μC), respectively, which is provided with an interface interfacing data communication between RF-ID tag reader device 600 and terminal 700 and one or more applications executed thereon, respectively.

In case the configuration of the information stored in the tag memory 648 is limited to e.g. a specific application executed on the terminal 700, the externally visible RF-ID tag property is comparable to a read-only RF-ID tag. That means, another communicating RF-ID tag reader device recognizes the RF-ID tag reader device 600 as a read-only RF-ID tag when the RF-ID tag reader device 600 is switched to RF-ID tag functionality. In particularly, the other communicating RF-ID tag reader device recognizes the RF-ID tag reader device 600 as a passive read-only RF-ID tag when the RF-ID tag reader device 600 is switched to RF-ID tag functionality.

The configurable tag memory 648 may be understood as dynamic tag memory 648, which on the one side shows read-only properties to other communicating RF-ID tag reader devices, whereas the information stored in the tag memory 648 is modifiable under circumstances enlightened above. In principle, the storage capacity of the tag memory 648 is not limited such that the capacity may be adapted to range of applications, to which the information stored in the tag memory 648 is dedicated. In particular, the storage capacity may be adapted to such an amount, which is typically for passive read-only small RF-ID tags. The distance between a passive read-only RF-ID tag and a RF-ID tag reader device for communicating therebetween is limited due to the fact that field energy of the interrogating signal, which is emitted by the RF-ID tag reader device, is used for energizing the passive RF-ID tag. This implies that the information stored in the passive RF-ID tag has to be transmitted as long as the passive read-only RF-ID tag and the RF-ID tag reader device retrieving the information stored in the passive RF-ID tag are spaced apart in an adequate distance even in case one of the communicating devices (the RF-ID tag and the RF-ID tag reader device, respectively) are in motion. The smaller the storage capacity and the amount of information communication between the RF-ID tag and the RF-ID tag reader device the higher the probability of reliable transmission. A typical passive read-only RF-ID tag and therefore also the tag memory 648 may be provided with a storage capacity of 612 bytes to 606 bytes but the present invention shall not be understood as limited thereto.

Alternatively, a security logic, which can be implemented in the tag logic 646, may allow providing configurability of the tag memory 648 similar to a RF-ID tag of re-writeable type and in particular similar to a passive re-writeable RF-ID tag. In this case the security logic ensures information integrity and/or authenticated access.

A configurable tag memory may be realized as a non-volatile storage component. For example programmable read-only memory (PROM) or electrical erasable read-only memory (EEPROM) may be employed. But also promising non-volatile configurable storage technologies such as magnetic random access memory (MRAM), ferrite random access memory (FRAM) or non-volatile random access memory on the basis of polymer material may be employed. The enumeration is not limited thereto but further non-volatile configurable storage technologies may be used. Non-volatile configurable storage technologies are primarily addressed since one of the advantages of the present invention is that the show communication mode (which corresponds to the explained RF-ID tag functionality of the RF-ID tag reader device 600) is independence from any power supply.

FIG. 5C depicts a block diagram illustrating an alternative embodiment of a RF-ID tag reader device according to still another embodiment of the invention. The RF-ID tag reader device embodiment illustrated in FIG. 5C is comparable to the RF-ID tag reader device embodiment shown in FIG. 5A in several points. A common RF interface 606 and a common antenna 608 serve for RF-ID tag reader functionality and RF-ID tag functionality. The reader logic 646 is realized as a microcontroller (μC) and a microprocessor (μP), respectively, which provides for data communication interface to the terminal 700 and the application 400 executed thereon, respectively. The reader logic operates the interface and protocol framework for communicating with RF-ID tags (passive communication mode) and in particular, when supporting active communication mode, for communicating with RF-ID tag reader devices. An optional reader memory 642 is associated with the microcontroller (μC) and a microprocessor (μP), respectively.

A switch/logic component 650 is interposed between RF interface 606 and reader logic 640 to switch between RF-ID tag reader functionality and RF-ID tag functionality as described in detail above. The switch/logic component 650 implement tag logic necessary for providing RF-ID tag functionality. Correspondingly, the tag memory 648 is connected to the switch/logic component 610.

The common RF interface 606 provides signals to the switch/logic component 650, which are required for operation of RF-ID tag reader functionality and RF-ID tag functionality, wherein in this embodiment the switch/logic component 650 passes through signals to the microprocessor (μP) 640, which are required by the microprocessor (μP) 640. The passing through of the signals depend on the switching state of the switch/logic component 650. Alternatively, the switch/logic component 650 and the microprocessor (μP) 640 may be implemented in a common logic component (not shown), which is adapted to operate functions of the switch/logic component 610 as well as functions of the microprocessor (μP) 640.

As aforementioned, the switching state of the switch/logic component 650 and the switch defines the functionality of the RF-ID tag reader device 600, respectively. The switching state and therefore the switching operation is important to ensure proper operation of the RF-ID tag reader device 600 as enlightened. According to an embodiment, the switching state of the switch/logic component 650 and the switch is controlled by a switching signal supplied thereto via the switch line 110. The switching signal is generated by the terminal 700, to which the RF-ID tag reader device 600 is connected. The controlling of the switching state by an specific application executed on the terminal 700 may be critical and less reliable, respectively, since in case of a sudden or unexpected loss of power of the terminal 700 the switching state is undefined or the switching state remains in its former switching state such that RF-ID tag functionality may not be switched. This situation may be unsatisfactory.

In a more reliable embodiment of the RF-ID tag reader device 600 according to the present invention, the selecting of the switching state may be semi-autonomously or autonomously (corresponding to a semi-autonomous operation mode and a autonomous operation mode, respectively). Semi-autonomous operation mode means that for example in case of a sudden or unexpected power loss or always when the RF-ID tag reader device 600 is out of power supply the RF-ID tag functionality is selected and the switching state is correspondingly adapted thereto. Analogously, the RF-ID tag reader device 600 may be operable with RF-ID tag reader functionality in case the terminal 700 and one or more applications executed thereon, respectively, instruct to select/switch to RF-ID tag reader functionality. So if no explicit indication to select RF-ID tag reader functionality is present the RF-ID tag reader device 600 is operated in RF-ID tag functionality by default.

In autonomous operation mode the switch, i.e. the switch and the switch/logic component 650 respectively, comprise a switching logic which autonomously selects and switches between the RF-ID tag functionality and the RF-ID tag reader functionality.

It shall be noted, that the RF-ID tag reader functionality may support passive communication mode and active communication mode in accordance with near field communication standard (ECMA-340) and the RF-ID tag functionality may support show communication functionality which has been defined above and described in detail.

Further details on a RF-ID tag reader with transponder functionality are described PCT Application IbO3/02900, filed Jul. 23, 2003, assigned to Nokia Corporation and fully incorporated herein by reference.

Figure 6:
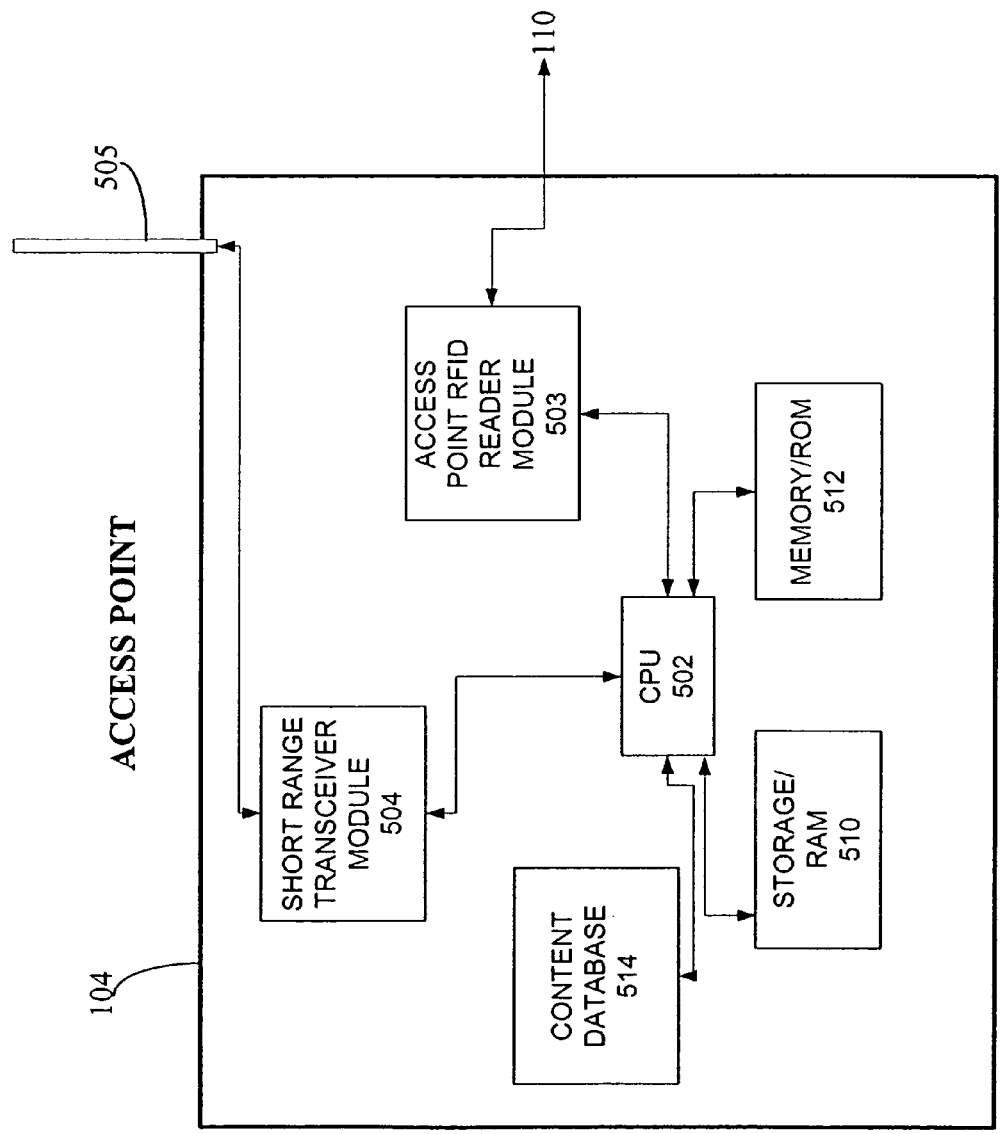
FIG. 6 is a representation of an access point in the system of FIG. 1, according to one embodiment of the invention.

FIG. 6 is a representation of the access point 104 according to one embodiment of the invention. The access point RF-ID module 503 is connected to the RF-ID reader 110. The access point RF-ID module 503 transfers the Bluetooth serial number and Bluetooth Clock Offset information received from the terminal 102, to the CPU 502. The CPU 502 controls a short-range transceiver module 504 for initiating Bluetooth inquiry and paging processes with the terminal 102, via an antenna 505. The CPU 502 is further connected to storage RAM 510 and the read-only memory 512, which provide the connections and protocols to enable the terminal 102 to interact with a content database 514. The user at terminal 102 interacts with the content database 116 using the WAP protocol. At the conclusion of the user's session with the content database, the terminal-to-access point connection is dropped.

Figure 7:
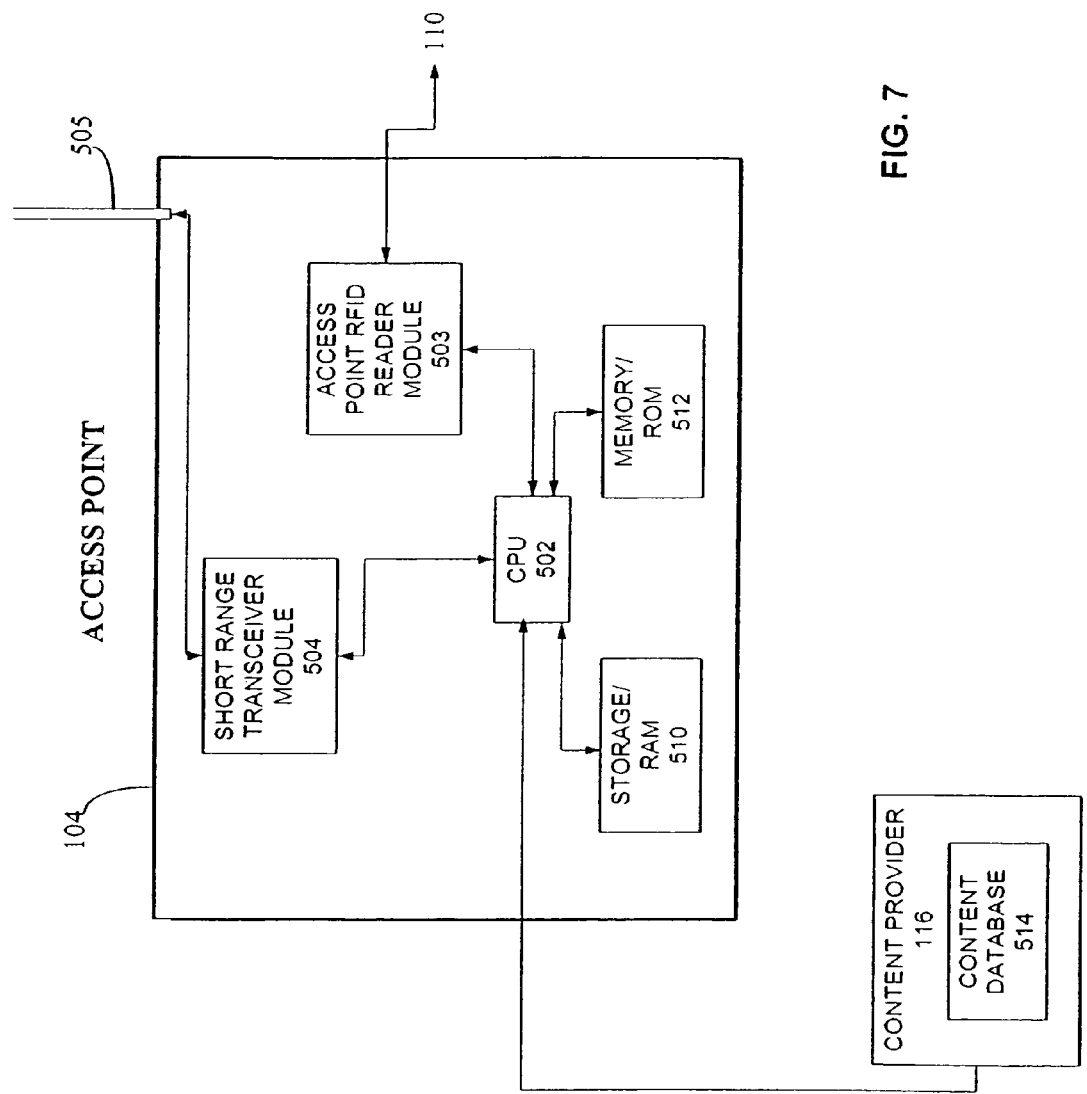
FIG. 7 is a representation of the access point of FIG. 6 coupled to a content provider for conducting interactive services, according to one embodiment of the present invention.

FIG. 7 discloses the access point of FIG. 5 in which the CPU 502 is linked to the remote content provider 116 (See FIG. 1) including the content database 514. The CPU 502 implements terminal-to-content provider signaling using program instructions stored in the memory/ROM 512, after establishing a connection with the terminal 102 using the access point RF-ID module 503 input.

Figure 8:
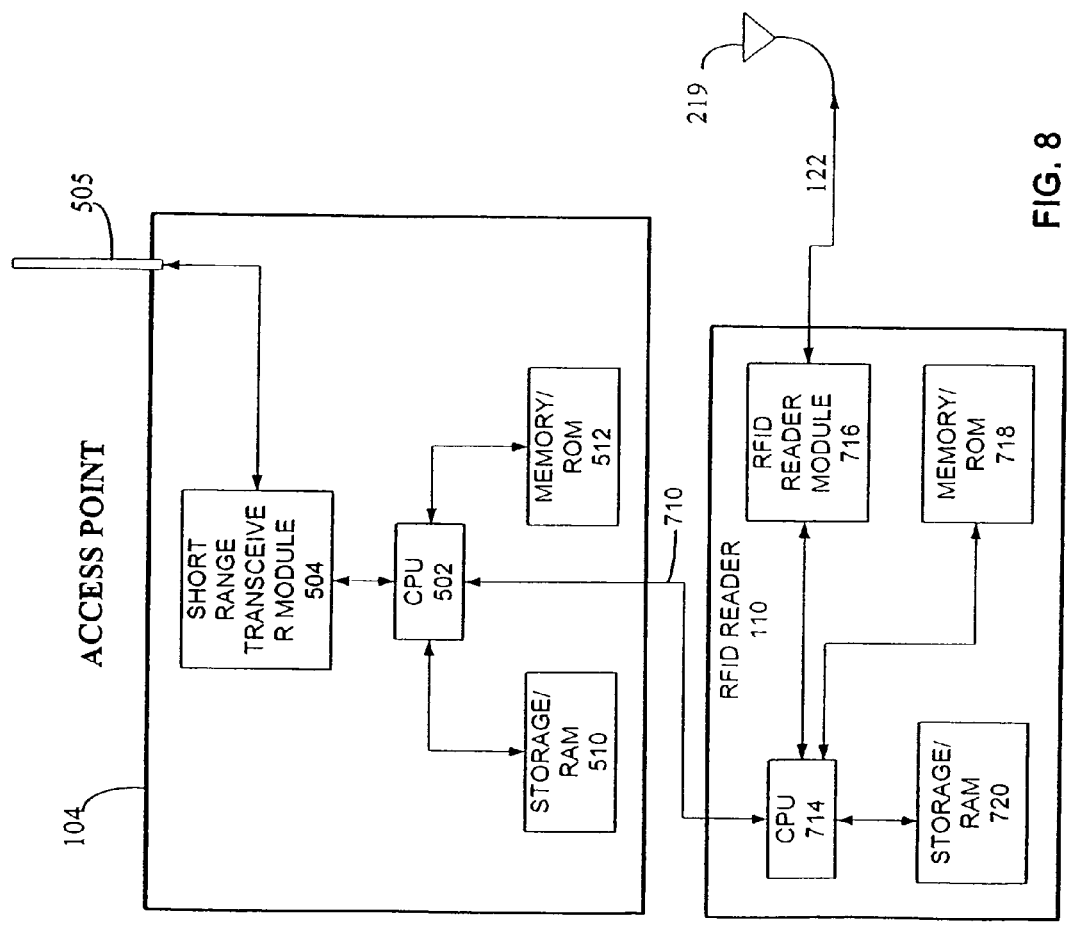
FIG. 8 is a representation of an access point of FIG. 6 coupled to the RF reader providing terminal tag information for establishing a session with the terminal of FIG. 2 or 3, according to one embodiment of the invention.

FIG. 8 shows the RF-ID reader 110, connected to the access point 104 via a connection 710, according to one embodiment of the invention and transferring the Bluetooth serial number and possibly the Bluetooth Clock Offset information received from the terminal 102 via the antenna 219. The CPU 502 receives the demodulated serial number signal and clock information generated by the RF-ID reader module 716 based upon the connectionless communication between the terminal 102 and the RF-ID reader 110. The CPU 714 packetizes the Bluetooth serial number and Bluetooth Clock Offset information for transfer over line 710 to the access point 104 using programs available in the memory 718. The access point 104 initiates the Bluetooth paging process in lieu of the Bluetooth inquiry process and the access point serves as the master device based upon the user identification, terminal serial number and clock information. The clock information allows the access point to speed up the connection establishment with the mobile terminal in establishing a session with the terminal 102 even more. By replacing the possibly time-wasting Inquiry procedure with faster RF-ID identification method session set-up time is shortened and also Bluetooth master-slave switching step is eliminated because the access point automatically becomes the master in response to initiating the paging. Alternatively the access point 104 may send a service notification message including links to local services as described in copending application Ser. No. 09/985, 444, filed Nov. 1, 2001, assigned to the same assignee as that of the present invention and fully incorporated herein by reference.

Figure 9:
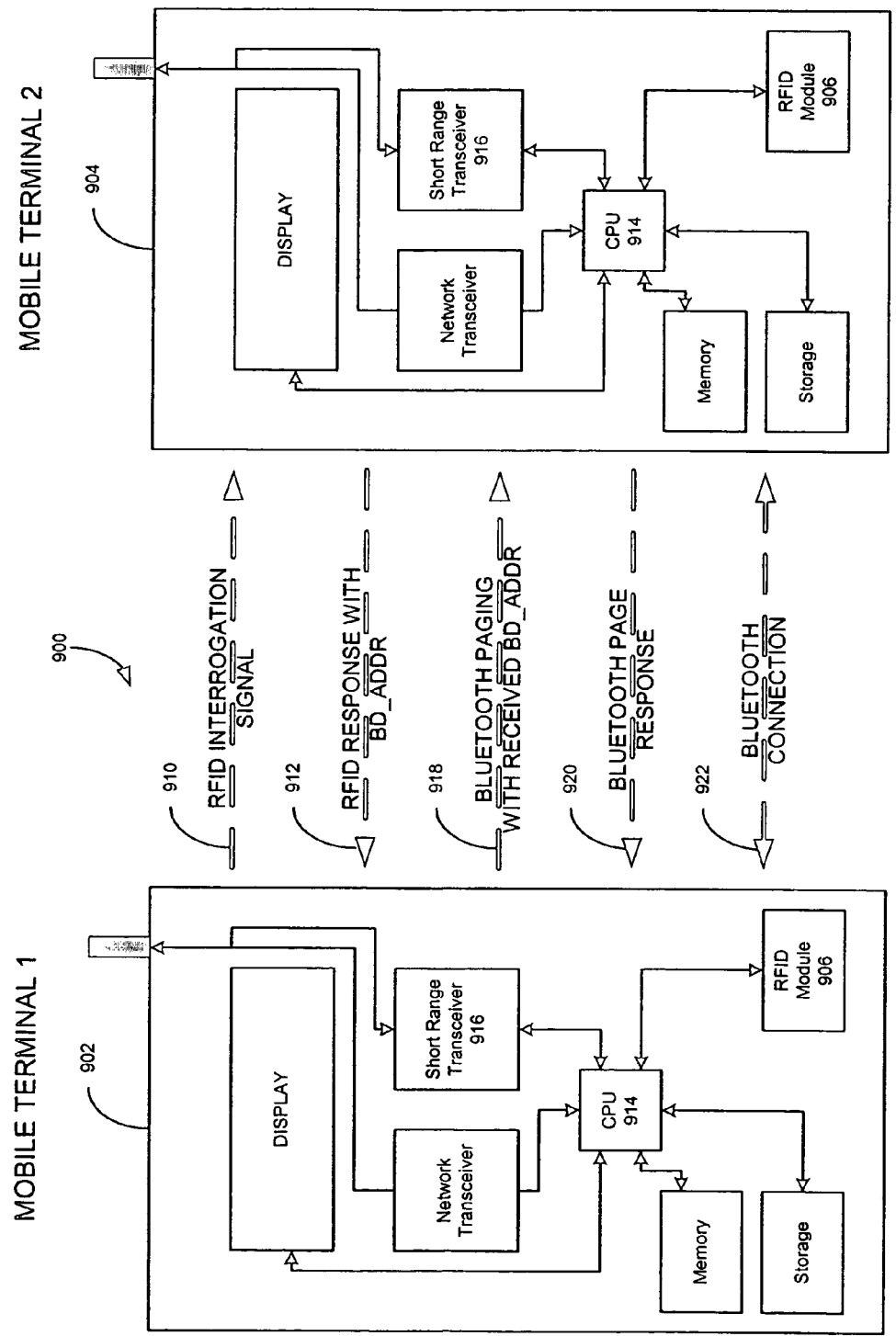
FIG. 9 is a communication process having shortened terminal discovery and user identification in establishing a Bluetooth connection between mobile terminals with RF-ID tag functionality operating in a show communication mode described in FIG. 5B.
Figure 9A:
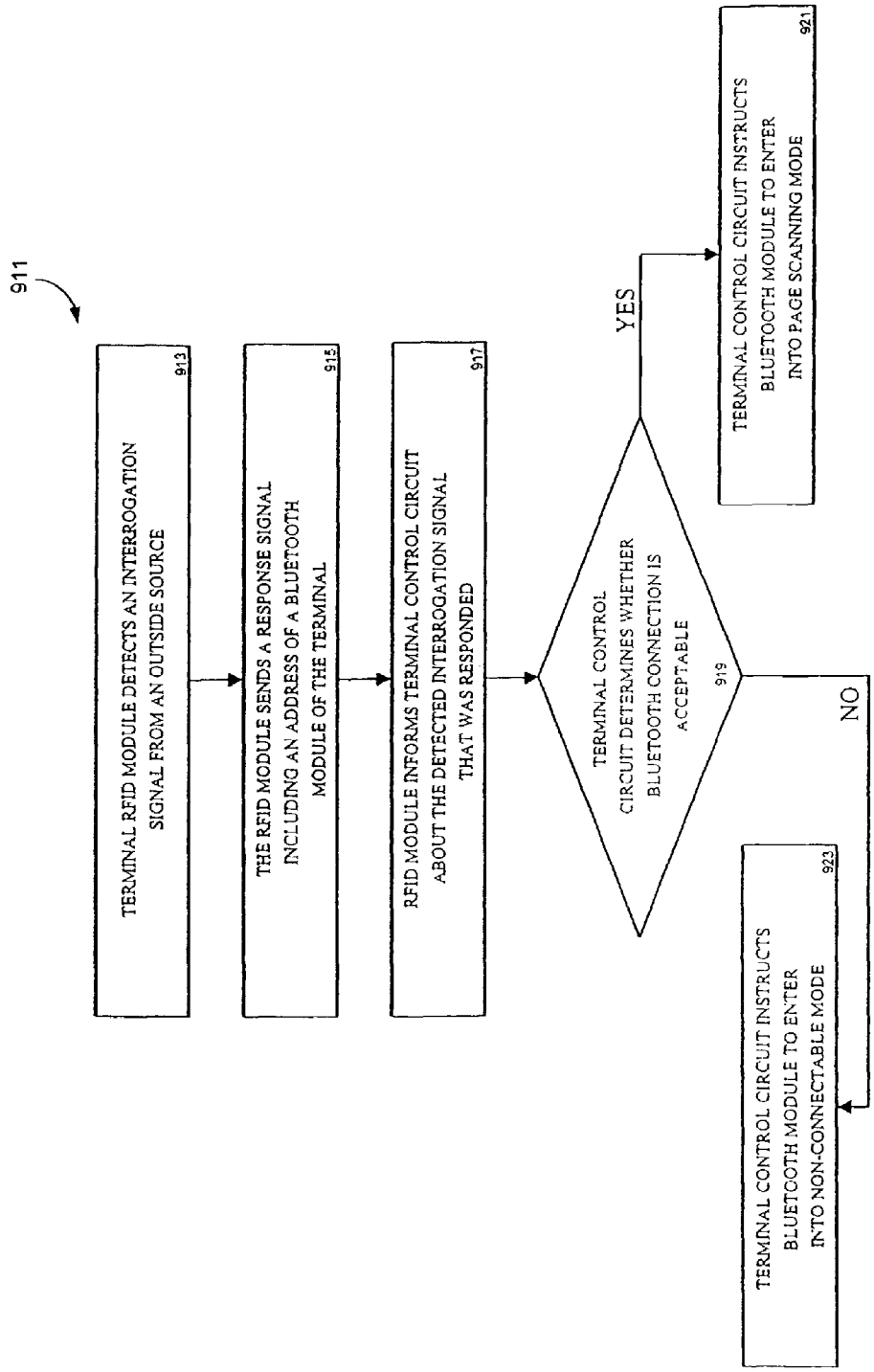
FIG. 9A is a process 911 for determining whether a terminal within the range of an interrogating signal from another terminal should establish a Bluetooth connection to the another terminal.

FIG. 9 describes one embodiment of a communication process 900. Each terminal includes a RF-ID reader module 906, 908, which may act in an active mode or a passive mode, according to the ECMA 340 standard . . . In the present instance, the readers operate in a show communication mode., as described in FIG. 5B. The terminal 902 generates an interrogating signal 910. When the terminal 904 comes within the range of the signal 910, it enters into a process 911, shown in FIG. 9A, for processing the signal. In step 913, the terminal RF-ID module detects the interrogation signal. In step 915, the RF-ID module sends a response signal to 902 including an address of a Bluetooth module of the terminal 904. A terminal control circuit included in the terminal 904 and responsive to a processor 208 (See FIG. 4) is informed about the detected interrogation signal that was responded to in step 917. The terminal control circuit performs a determination in step 919 to determine whether a Bluetooth connection is acceptable. A "Yes" determination result causes the terminal control circuit in step 921 to instruct the Bluetooth module to enter into a page scanning mode. A "NO" determination result causes the terminal control circuit in step 923 to instruct the Bluetooth module to enter into a non-connectable mode. The determination may be based on the current mode of the Bluetooth module of the terminal. For example, if the terminal Bluetooth module is already set into a non-connectable mode, the event of detecting an interrogation signal does not override the current terminal settings. Also, the current context of the terminal may define whether the terminal Bluetooth connection is acceptable. As one example when a terminal is set into a silent mode also the Bluetooth connection may be set into non-acceptable.

Returning to FIG. 9, the terminal 904 transmits a paging response message 920 to the terminal 902 using the BD_ADDR of the terminal 902 included in the message 918 The terminal 902 proceeds to establish a connectionless connection with the terminal 904 serving as the slave and the terminal 902 serving as the master device. Further details on establishing a Bluetooth connection between terminals whether mobile or stationary are described in the text as described in Bray, et al., "Bluetooth Connect Without Cable", at pg. 73-85.incorporated herein by reference. The terminals 902 and 904 exchange information with the reader module 906 simulating a RF-ID tag reader and the reader module 908 simulating a RF-ID tag in a passive mode.

Figure 10:
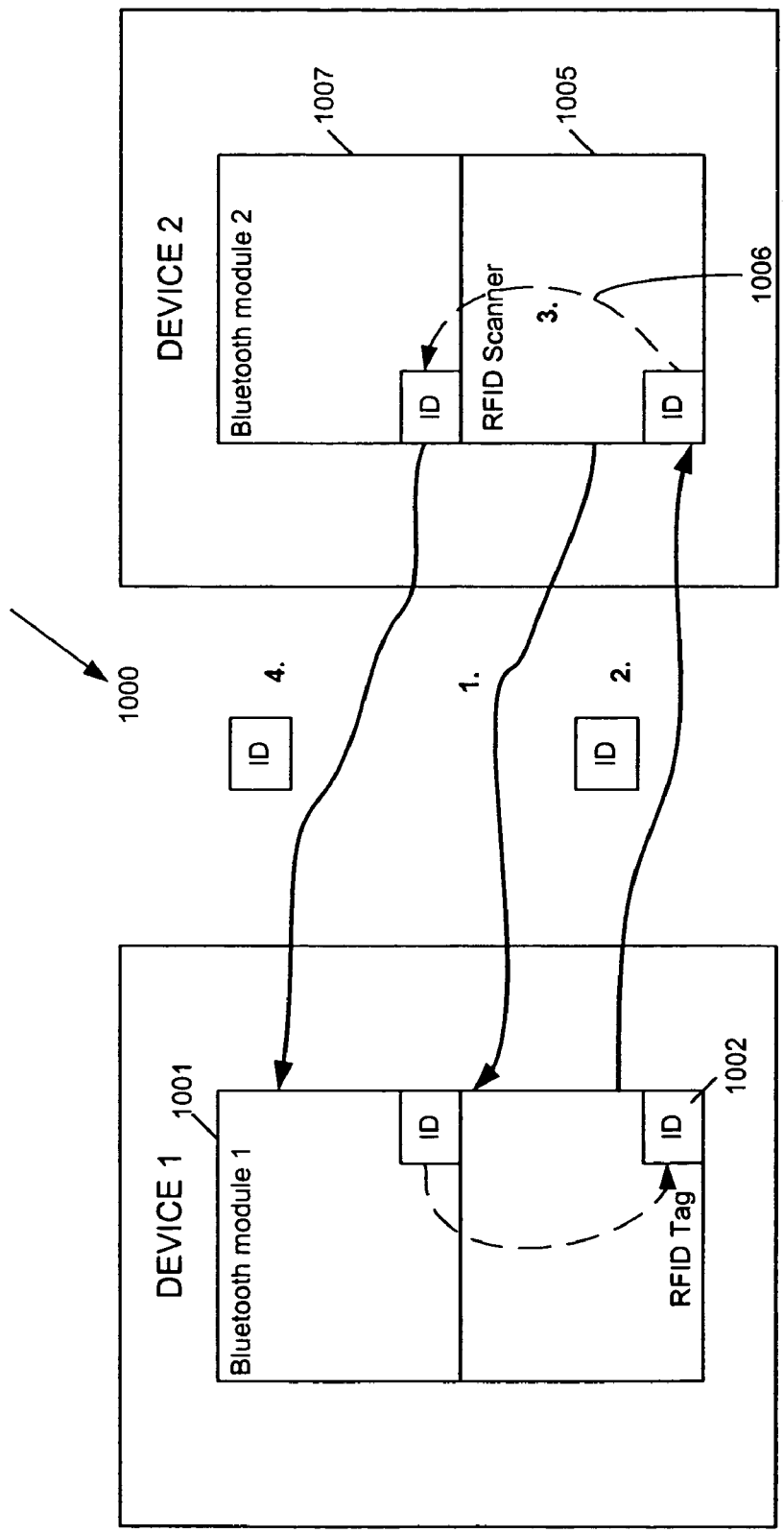
FIG. 10 is a session set-up process reducing session setup time between mobile terminals with RF-ID tag reader devices having tag Punctuality operating in a powered down show communication mode described in FIG. 5C in establishing a Bluetooth connection in FIG. 1.

FIG. 10 is a representation of a shortened session setup process 1000 for the system of FIG. 1, where the device 1 and device 2 are portable devices and device 2 serves as an access point. Device 1 includes a Bluetooth terminal 1001 and a RF-ID tag reader 1003 in a powered down state The device 2 includes a RF-ID tag reader as scanner 1005 coupled via scanner channel 1006 to a Bluetooth module 1007 serving as the access point for the system. The RF-ID tag readers 1002 and 1005 have tag functionality and operate in a show communication mode, as described in FIG. 5C In step 1, The device RF-ID scanner 1005 energizes the RF-ID tag 1003 of device 1 and in step 2 at least a portion of the device 1 ID information is transmitted, via the RF-ID scanner channel 1006 to device 2. The received ID information of the device 1 module is forwarded to the device 2 module via the scanner channel 1006 in step 3. The device 2 module sets up a connection through a Bluetooth channel to page the Bluetooth module 1001 using the ID information of the Bluetooth module, plus other module 1 identification stored in device 2.

The paging process can be accelerated when the device 1 transmits the terminal clock information in the response to the device 2 scan of the device 1 tag information. Where the terminal clock time is provided with the tag information, the paging operation scan eliminates the random backup time and the master slave switch time, as described in Bray, et al., supra.

Figure 11:
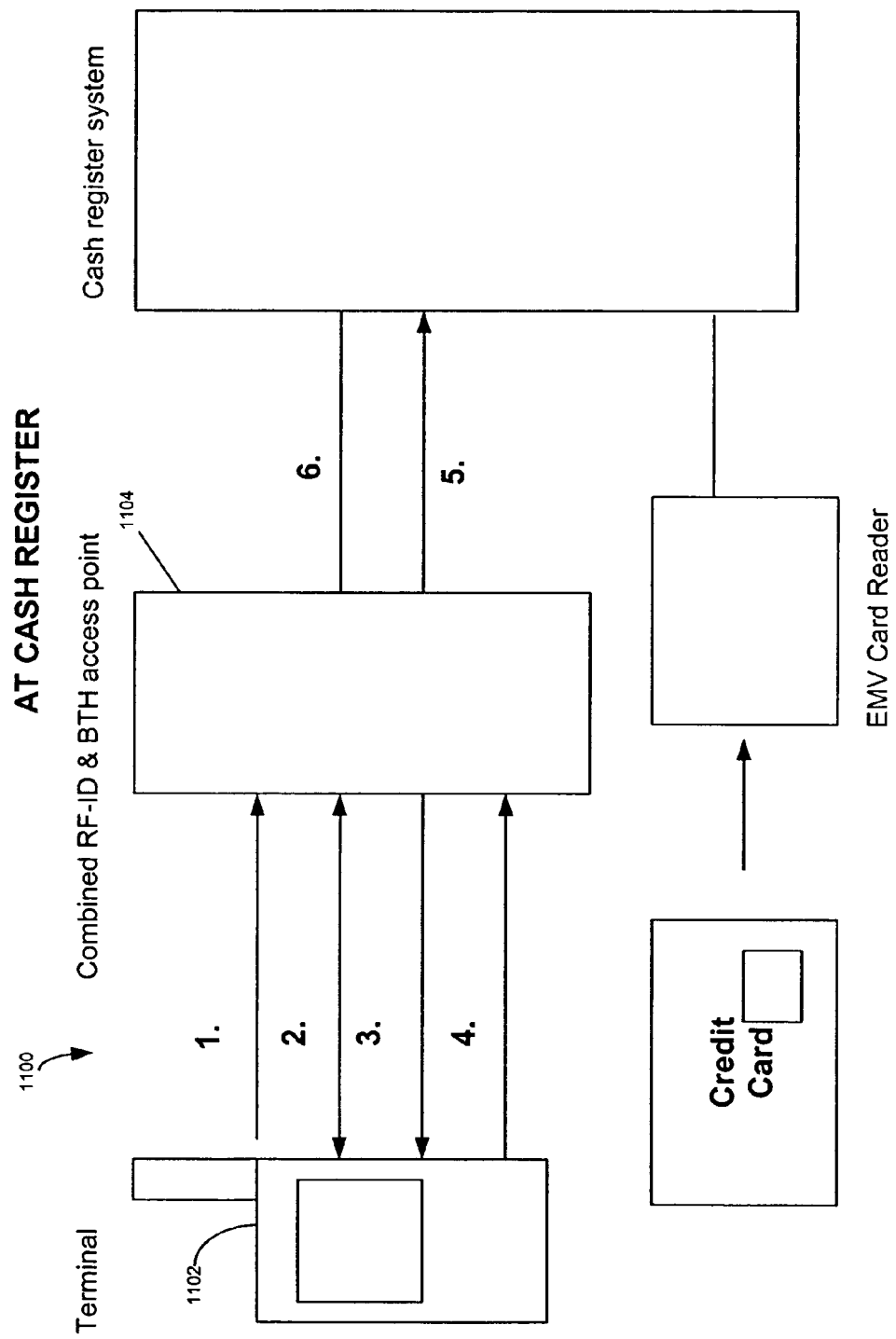
FIG. 11 is a representation of a process for conducting a cash transaction or a credit card transaction with a user in the system of FIG. 1, according to one embodiment of the invention.

FIG. 11 describes a service scenario 1100 for a cash register transaction initiated by the terminal 102, according to one embodiment of the invention.

In step 1, the terminal 1102 is subjected to a RF field by a reader/Bluetooth access point 1104 and the Bluetooth terminal serial number and user credit card number are transferred to the reader using the RF-ID inductive coupling or electromagnetic wave propagation technology previously described in conjunction with FIGS. 2, 3 and 4.

In step 2, the terminal user identification and serial number are used by the access point in a paging operation to establish a session with the terminal.

In step 3, the access point pushes a PIN request to the terminal over the air-link interface. The PIN request may contain more information about the payment transaction. For example, the quantities, type and cost of the merchandise involved in the cash register transaction could be provided.

In step 4, after the user has inputted the PIN number to the terminal display, the terminal sends the PIN number to the access point via the Bluetooth connection.

In step 5, the terminal information is transferred via the access point to the cash register system for processing and completion of the transaction in step 6.

The cash register scenario assumes a passive tag for the generation of the user identification and Bluetooth terminal serial number. A semi-passive or active tag can provide a response to the access point, including the clock information of the terminal. When the terminal clock time is provided, the access point serves as the master device and eliminates the random backup time that other wise would be required by the device in an inquiry or discovery process. Further the master-slave switch time is eliminated in establishing a logical connection between the access point and the terminal.

Figure 12:
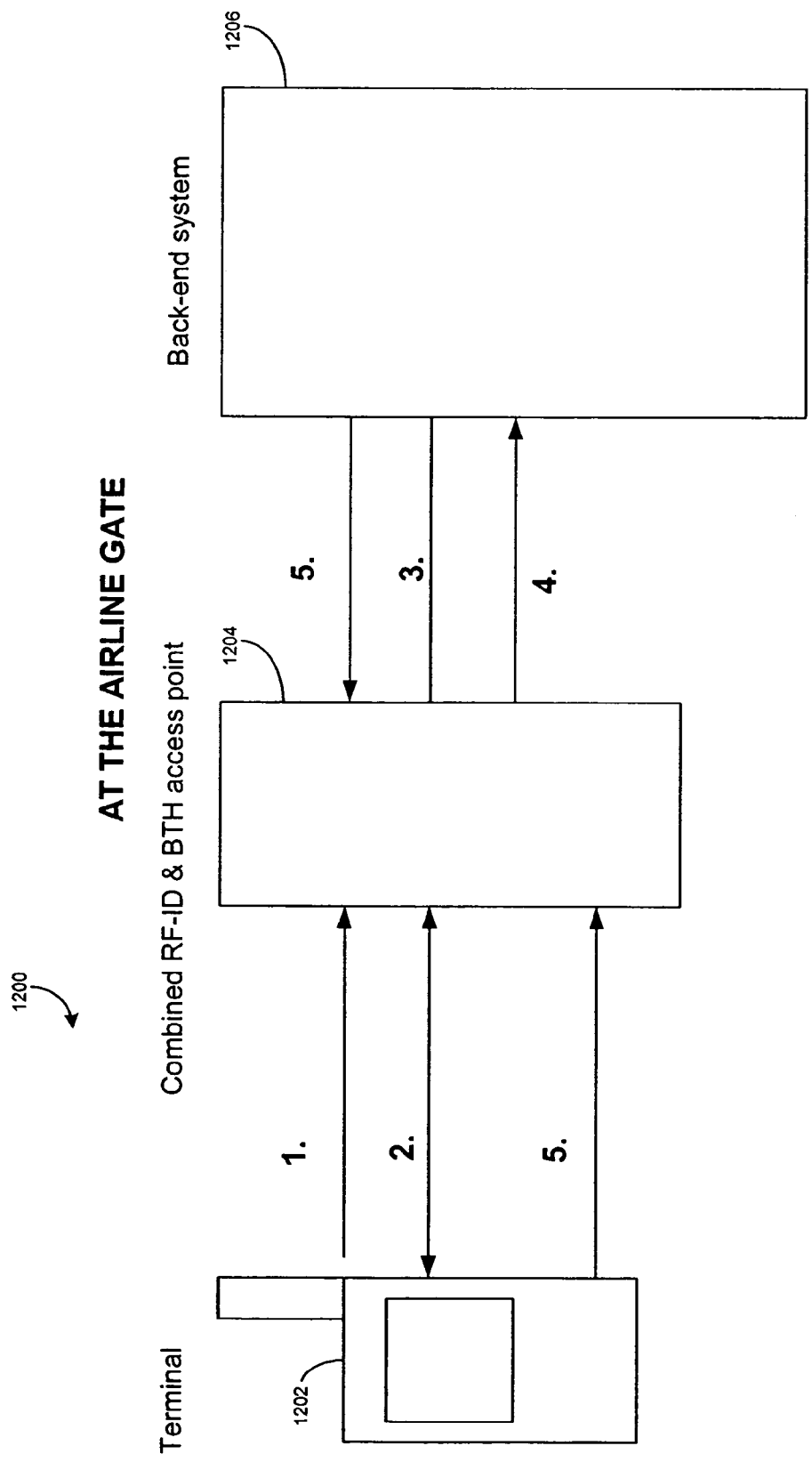
FIG. 12 is a representation of a process providing a user with flight information at an airline gate, using the system of FIG. 1, according to one embodiment of the invention.

FIG. 12 is a second scenario 1200 for a Bluetooth terminal user 1202 at an airline gate scenario according to one embodiment of the invention.

In step 1, the Bluetooth terminal serial number and passenger card number are transferred to the access point 1204 using RF-ID technology, either inductive coupling or electromagnetic wave propagation coupling.

In step 2, a Bluetooth session setup is established between the access point and the terminal using the terminal's Bluetooth serial number.

In step 3, the user's passenger card information is transferred to a back-end system 1206

In step 4, the back-end system opens the gate, based upon passenger card information, and In step 5, the airline backend system sends the user personalized information about flight and destination via the access point-terminal session. Alternatively, the airline backend system may be adapted to serve as an access point enabling the terminal to interact directly with the backend system after establishing a session based upon inductive or electromagnetic wave propagation coupling of the terminal tag and clock information to the backend system.

Summarizing, the present invention describes a method and system for establishing a fast wireless connection between a terminal and a service application using RF-ID connectionless communication between the terminal and a RF-ID reader tag/access point. The RF-ID tag reader device supports RF-ID tag reader—RF-ID tag communication and RF-ID tag reader—RF-ID tag reader communication. The support of RF-ID tag reader—RF-ID tag reader communication is an optional feature and not mandatory for the RF-ID tag reader device according to an embodiment of the invention. The RF-ID tag functionality of the RF-ID tag reader device according to an embodiment of the invention, also referred as show communication mode, may allow for substituting RF-ID tag reader—RF-ID tag reader communication in many ranges of applications. The terminal transmits user and terminal identification plus terminal clock information to the reader/access point using inductive or electromagnetic wave propagation coupling. The access point, which can also be another mobile terminal, uses the terminal identification and clock information to establish a wireless connection to the terminal. A paging operation is established in lieu of an inquiry or discovery operation, the later shortening session set-up time and user identification by eliminating the random backup time and slave master switch time which would otherwise be required in an inquiry or discovery process in establishing a wireless connection between the terminal and the access point. The invention is applicable to Bluetooth and other wireless standards.

While the invention has been described in a preferred embodiment, various changes can be made within the skill of a worker skilled in the without departing from the spirit and scope of the present invention, as defined in the appended claims, in which,

We claim:

1. A method, comprising:

a) generating a RF-ID interrogation signal by a first terminal equipped with a RF-ID tag reader device;

b) detecting the RF-ID interrogation signal by a second terminal when within the range of the RF-ID interrogation signal;

c) in response to detecting the presence of the RF-ID interrogation signal, providing a notification to activate a processor in the second terminal, the processor using the notification for setting a short-range communication module in the second terminal into a page scanning mode for detecting paging signals directed to the second terminal;

d) responding to the RF-ID interrogation signal by transmitting a RF-ID response signal to the first terminal including identification information relating to the short-range communication module of the second terminal;

e) processing the received RF-ID response signal by the first terminal to activate a short-range communication module in the first terminal to initiate a shortened session setup by skipping the inquiry stage; transmitting a short-range paging signal directed to the second terminal based on information of the received RF-ID response signal and entering a page mode to establish a short-range connection with the second terminal; and f) detecting the paging signal by the short-range communication module in the second terminal for immediate establishment of a short-range connection between the first and second terminals by skipping the inquiry stage.

2. The method of claim 1 further comprising:

g) incorporating in the second mobile terminal a RF-ID tag reader having tag functionality and terminal identification information.

3. The method of claim 2 further comprising:

h) switching the RF-ID tag reader in the second terminal to operate in a show communication mode and simulate a RF-ID tag device.

4. The method of claim 1 wherein the first and second terminals include RF-ID tag readers operating in an active mode.

5. The method of claim 1 wherein the RF-ID tag reader of the second terminal operates in a powered down state and passive mode.

6. The method of claim 4 wherein one RF-ID tag reader automatically switches to a passive state when de-energized.

7. The method of claim 1 wherein the short-range communication modules of the first and the second terminals conform to the principles of Bluetooth technology.

8. The method of claim 7 wherein the processor of the second terminal responding terminal to the second terminal informs the Bluetooth module of the second terminal to enter into a Bluetooth page scan mode after detecting an interrogation signal and responding to it with identification information of the Bluetooth communication module in order to provide a shortened device discovery and session setup between the terminals.

9. The method of claim 1, wherein the first and the second terminals are mobile terminals.

10. The method of claim 9 further comprising:

j) determining whether a short-range connection is acceptable.

11. The method of claim 10 further comprising:

k) instructing the short-range communication module to enter into a page scanning mode if the Bluetooth mode is acceptable.

12. Method of claim 10 further comprising:

l) instructing the short-range communication module to enter into a non-connectable connection if the Bluetooth mode is not acceptable.

13. The method of claim 1 further comprising:

(iv) instructing the second terminal to enter into a page scanning mode if the notification indicates a Bluetooth connection is acceptable.

14. The method of claim 1 further comprising:
(iv) instructing the second terminal to enter into a non-connectable mode if the notification indicates a Bluetooth connection is not acceptable.

15. The method of claim 1 further comprising
(iv) determining if a Bluetooth connection between the first and second terminals is acceptable using a control circuit responsive to the processor.

16. A method, comprising:
a) receiving a notification signal indicating presence of an RF-ID interrogation signal from an associated RF-ID communications module in response to detecting an interrogation signal by said RF-ID communications module; and
b) in response to the notification signal, instructing an associated wireless short-range communication module to skip an inquiry stage and enter into a predefined shortened session set-up operation mode for detecting paging signals addressed to said wireless short-range communication module.

17. The method of claim 16 further comprises:
c) including in a RF-ID response signal at least a unique Bluetooth identification number of the wireless short-range communication module.

18. The method of claim 16 further comprises:
c) including in a RF-ID response signal a Bluetooth serial number and Bluetooth Clock Offset information of the wireless short-range communication module.

19. The method of claim 16 further comprises:
c) entering into a Bluetooth page scan mode after detecting the interrogation signal.

20. The method of claim 16 further comprises:
c) receiving a paging signal as an initial signal to activate the wireless short-range communication module.

21. The method of claim 16 further comprises:
c) skipping an inquiry stage and initiating a shortened session set up upon receiving a paging signal.

22. The method of claim 16 wherein the associated wireless short-range communication module is instructed to enter into a page scanning mode if the notification indicates a Bluetooth connection is acceptable.

23. The method of claim 16 wherein the associated wireless communication module is instructed to enter into a non-connectable mode if the notification indicates a Bluetooth connection is not acceptable.

24. An apparatus, comprising:
a) a processor;
b) a wireless short-range communication module; and
c) a near field communication module configured to detect a RF-ID interrogation signal and send a response signal including identification information relating to the wireless short-range communication module;
wherein the processor is configured to instruct the wireless short range-communication module to skip an inquiry stage and enter into a predefined operation mode for detecting paging signals addressed to the wireless short-range communication module in response to receiving a notification signal indicating presence of the RF-ID interrogation signal from the near field communication module.

25. The wireless communication terminal of claim 24 further comprises:
d) a unique Bluetooth identification number of the wireless short-range communication module included in a RF-ID response signal.

26. The wireless communication terminal of claim 24 further comprises:
d) a Bluetooth serial number and Bluetooth Clock Offset information of the wireless short-range communication module including in a RF-ID response signal.

27. The wireless communication terminal of claim 24 further comprises:
d) entering into a Bluetooth page scan mode into after detecting the interrogation signal.

28. The wireless communication terminal of claim 24 further comprises:
d) a paging signal to activate the wireless communication module after receiving the interrogation signal.

29. The wireless communication terminal of claim 24 further comprises:
d) skipping an inquiry stage and establishing a shortened session set upon receiving a paging signal.

30. A computer readable storage medium including program code, executable in a computer system, comprising:
i) program code for receiving a notification signal indicating presence of a RF-ID interrogation signal from an associated RF-ID communications module in response to detecting an interrogation signal by said RF-ID communications module and in response to the notification signal;
ii) program code for instructing an associated wireless short-range communication module to skip an inquiry stage and enter into a predefined shortened session set-up operation mode for detecting paging signals addressed to said wireless short-range communication module.

31. The computer readable storage medium of claim 30, further comprising:
iii) program code for entering into a Bluetooth page scan mode after detecting the interrogation signal.

32. The computer readable storage medium of claim 30, further comprising:
iv) program code for receiving a paging signal to activate the wireless short-range communication module.

33. The computer readable storage medium of claim 30, further comprising:
v) program code for skipping an inquiry stage and initiating a shortened session set up upon receiving a paging signal.

34. A system, comprising:
a) a first terminal equipped with a RF-ID tag reader device configured to generate a RF-ID interrogation signal;
b) a second terminal configured to detect the RF-ID interrogation signal when within the range of the RF-ID interrogation signal;
c) a processor in the second terminal activated upon notification by the second terminal responsive to the interrogation signal, the processor using the notification for setting a short-range communication module in the second terminal into a page scanning mode for detecting paging signals directed to the second terminal;
d) a transceiver in the second terminal responding to the RF-ID interrogation signal by transmitting a RF-ID response signal to the first terminal including identification information relating to the short-range communication module of the second terminal;
e) a transceiver in the first terminal processing the received RF-ID response signal by the first terminal to activate a short-range communication module in the first terminal to initiate a shortened session setup by skipping the inquiry stage; transmitting a short-range paging signal directed to the second terminal based on information of the received RF-ID response signal and entering a page mode to establish a short-range connection with the second terminal; and f) a detector detecting the paging signal by the short-range communication module in the second terminal for initiating immediate establishment of a short-range connection between the first and second terminals by skipping the inquiry stage.

\* \* \* \* \*

UNITED STATES PATENT AND TRADEMARK OFFICE
CERTIFICATE OF CORRECTION

PATENT NO.       : 7,565,108 B2
APPLICATION NO.  : 10/804081
DATED            : July 21, 2009
INVENTOR(S)      : Sakari Kotola et al.

Page 1 of 1

It is certified that error appears in the above-identified patent and that said Letters Patent is hereby corrected as shown below:

In Column 22

Claim 8, line 42, "wherein the processor of the second terminal responding terminal to the second terminal informs the Bluetooth module" should read, --wherein the processor of the second terminal responding to the first terminal informs the Bluetooth module--;

In Column 24

Claim 27, line 8, "Bluetooth page scan mode into after detecting" should read, --Bluetooth page scan mode after detecting--.

Signed and Sealed this

Twenty-fourth Day of November, 2009

David J. Kappos
*Director of the United States Patent and Trademark Office*